(12) United States Patent
Gatto

(10) Patent No.: US 7,636,680 B2
(45) Date of Patent: Dec. 22, 2009

(54) METHODS AND SYSTEMS FOR MEASURING PERFORMANCE OF A SECURITY ANALYST

(75) Inventor: Joseph Gatto, San Francisco, CA (US)

(73) Assignee: StarMine Corporation, San Francisco, CA (US)

( * ) Notice: Subject to any disclaimer, the term of this patent is extended or adjusted under 35 U.S.C. 154(b) by 1231 days.

(21) Appl. No.: 10/194,940

(22) Filed: Jul. 12, 2002

(65) Prior Publication Data

US 2003/0065605 A1     Apr. 3, 2003

Related U.S. Application Data

(60) Provisional application No. 60/327,050, filed on Oct. 3, 2001.

(51) Int. Cl.
*G06Q 40/00*     (2006.01)

(52) U.S. Cl. .................................. 705/36 R; 705/35

(58) Field of Classification Search ............... 705/36 R, 705/36, 35
See application file for complete search history.

(56) References Cited

U.S. PATENT DOCUMENTS

| | | | |
|---|---|---|---|
| 3,270,190 A | 8/1966 | Lambert | |
| 4,884,217 A | 11/1989 | Skeirik et al. | 364/513 |
| 4,920,499 A | 4/1990 | Skeirik | 364/513 |
| 4,965,742 A | 10/1990 | Skeirik | 364/513 |
| 5,006,992 A | 4/1991 | Skeirik | 364/513 |
| 5,006,998 A | 4/1991 | Yasunobu et al. | 364/513 |
| 5,132,899 A | 7/1992 | Fox | 364/408 |
| 5,220,500 A | 6/1993 | Baird et al. | 364/408 |
| 5,365,425 A | 11/1994 | Torma et al. | 364/401 |
| 5,500,795 A | 3/1996 | Powers et al. | 364/401 |
| 5,502,637 A | 3/1996 | Beaulieu et al. | 364/408 |
| 5,557,513 A | 9/1996 | Frey et al. | 364/401 R |
| 5,608,620 A | 3/1997 | Lundgren | 395/201 |
| 5,613,072 A | 3/1997 | Hammond et al. | 395/204 |
| 5,675,746 A | 10/1997 | Marshall | 395/235 |

(Continued)

FOREIGN PATENT DOCUMENTS

| | | | |
|---|---|---|---|
| JP | 2000090150 A | | 3/2000 |
| JP | 2004046454 A | * | 2/2004 |
| WO | WO 94/06103 | | 3/1994 |
| WO | WO 01/80124 A2 | | 10/2001 |

OTHER PUBLICATIONS

The Hulbert Financial Digest, Jan. 20, 2000, vol. XX, No. 5.*

(Continued)

*Primary Examiner*—James P Trammell
*Assistant Examiner*—Scott S Trotter
(74) *Attorney, Agent, or Firm*—Pillsbury Winthrop Shaw Pittman LLP

(57) ABSTRACT

A method of measuring performance of a security analyst includes selecting an analyst that covers a set of securities, and a performance measurement time period. A value add is created by subtracting a return of a benchmark portfolio from a return of a simulated portfolio. The return of the benchmark portfolio is derived exclusively from a selected set of securities that are included in the set of securities covered by the analyst. The simulated portfolio has constituents and weights that are a function of the analyst's recommendations on the securities in the selected set.

53 Claims, 17 Drawing Sheets

U.S. PATENT DOCUMENTS

| | | | |
|---|---|---|---|
| 5,701,400 A | 12/1997 | Amado | 395/76 |
| 5,749,077 A | 5/1998 | Campbell | 705/36 |
| 5,761,442 A | 6/1998 | Barr et al. | 395/236 |
| 5,774,880 A | 6/1998 | Ginsberg | 705/36 |
| 5,774,881 A | 6/1998 | Friend et al. | 705/36 |
| 5,802,518 A | 9/1998 | Karaev et al. | 707/9 |
| 5,812,988 A | 9/1998 | Sandretto | 705/36 |
| 5,819,271 A | 10/1998 | Mahoney et al. | 707/9 |
| 5,845,285 A | 12/1998 | Klein | 707/101 |
| 5,852,811 A | 12/1998 | Atkins | 705/36 |
| 5,864,871 A | 1/1999 | Kitain et al. | 707/104 |
| 5,893,079 A | 4/1999 | Cwenar | 705/36 |
| 5,909,669 A | 6/1999 | Havens | 705/11 |
| 5,911,136 A | 6/1999 | Atkins | 705/36 |
| 5,918,217 A | 6/1999 | Maggioncalda et al. | 705/36 |
| 5,930,774 A | 7/1999 | Chennault | 705/36 |
| 5,946,666 A | 8/1999 | Nevo et al. | 705/36 |
| 5,948,054 A | 9/1999 | Nielsen | 709/200 |
| 5,950,176 A | 9/1999 | Keiser et al. | 705/37 |
| 5,956,691 A | 9/1999 | Powers | 705/4 |
| 5,961,598 A | 10/1999 | Sime | 709/224 |
| 5,963,922 A | 10/1999 | Helmering | 705/35 |
| 6,012,042 A | 1/2000 | Black et al. | 705/36 |
| 6,012,043 A | 1/2000 | Albright et al. | 705/36 |
| 6,021,397 A | 2/2000 | Jones et al. | 705/36 |
| 6,064,984 A | 5/2000 | Ferguson et al. | 705/36 |
| 6,064,986 A | 5/2000 | Edelman | 705/36 |
| 6,073,115 A | 6/2000 | Marshall | 705/35 |
| 6,078,904 A * | 6/2000 | Rebane | 705/36 R |
| 6,078,924 A | 6/2000 | Ainsbury et al. | 707/101 |
| 6,119,103 A | 9/2000 | Basch et al. | 705/35 |
| 6,125,355 A | 9/2000 | Bekaert et al. | 705/36 |
| 6,154,732 A | 11/2000 | Tarbox | 705/36 |
| 6,208,720 B1 | 3/2001 | Curtis et al. | 379/114 |
| 6,236,980 B1 | 5/2001 | Reese | 705/36 |
| 6,253,192 B1 | 6/2001 | Corlett et al. | 705/36 |
| 6,317,726 B1 | 11/2001 | O'Shaughnessy | 705/36 |
| 6,370,516 B1 | 4/2002 | Reese | 705/36 |
| 6,381,635 B1 | 4/2002 | Hoyer et al. | 709/207 |
| 6,510,419 B1 | 1/2003 | Gatto | 705/36 |
| 6,606,615 B1 | 8/2003 | Jennings et al. | 706/45 |
| 6,681,211 B1 | 1/2004 | Gatto | 705/36 |
| 6,748,389 B1 | 6/2004 | Cesare et al. | 707/100 |
| 6,792,399 B1 | 9/2004 | Phillips et al. | 703/2 |
| 7,016,872 B1 | 3/2006 | Bettis et al. | 705/36 R |
| 7,249,080 B1 | 7/2007 | Hoffman et al. | 705/36 |
| 7,251,624 B1 | 7/2007 | Lee et al. | 705/35 |
| 7,539,637 B2 | 5/2009 | Gatto | 405/36 R |
| 2002/0002524 A1 | 1/2002 | Kossovsky et al. | 705/36 |
| 2002/0019791 A1 | 2/2002 | Goss et al. | 705/36 |
| 2002/0022988 A1 | 2/2002 | Columbus et al. | 705/11 |
| 2002/0082966 A1 | 6/2002 | O'Brien et al. | 705/36 |
| 2002/0169701 A1 | 11/2002 | Tarbox et al. | 705/36 |
| 2003/0004766 A1 | 1/2003 | Sandoval et al. | 705/7 |
| 2003/0018556 A1 | 1/2003 | Squyres | 705/36 |
| 2003/0023686 A1 | 1/2003 | Beams et al. | 709/205 |
| 2003/0065600 A1 | 4/2003 | Terashima et al. | 705/36 |
| 2003/0084059 A1 | 5/2003 | Kelley et al. | 707/102 |
| 2004/0024656 A1 | 2/2004 | Coleman | 705/27 |
| 2005/0033807 A1 | 2/2005 | Lowrance et al. | 709/204 |
| 2006/0178918 A1 | 8/2006 | Mikurak | 705/7 |
| 2007/0162973 A1 | 7/2007 | Schneier et al. | 726/22 |

OTHER PUBLICATIONS

Conrad de Aenlle, Short Sellers' Puzzle: Not Whether, but Which?, Feb. 12, 1994, The International Herarld Tribune.*

Ron White, How Computers Work, 1998, Que Corporation, 4th Edition, 159, 42-49.*

John Downes, Dictionary of Finance and Investment Terms, 2003, Barron's Educational Series, Inc., 6th Edition, 594, 674, 678, 679.*

Dictionary of Business, 2001, Peter Collin Publishing.*

The Motley Fool, May 30, 1999, The Record Bergen County N.J., b.03.*

Dow Jones Global Titans Indexes, Dec. 17, 2000, Dow Jones & Company.*

Unknown, Quote.com May 7, 1998, Quote.com.*

Unknown, Webster's New World Computer Dictionary 2003, Wiley Publishing, Inc.*

Unknown, Academic Press Disctionary of Science and Technology 1992, Academic Press.*

Stephen A. Ross and Randolph W. Westerfield and Bradford D. Jordan, Fundamentals of Corporate Finance 1995, Richard D. Irwin, Inc., Third Edition, pp. 332-357.*

Stephen A. Ross and Randolph W. Westerfield and Bradford D. Jordan, Fundamentals of Corporate Finance 1995, Richard D. Irwin, Inc., Third Edition, pp. O-8 thru O-14.*

Zvi Bodie and Alex Kane and Alan J. Marcus, 1996, Third Edition, pages are the inside front and back covers p. No. 1-4 were added.*

Mark Davis, "Trying to Find the Newsletter that's Right for you can be daunting" Mar. 2, 1999, Buffalo News, p. A7.*

Robert G. Hagstrom, Jr., "The Warren Buffet Way" 1995, John Wiley & Sons, Inc. p. 4.* https://www.investars.com/home.asp, printed Mar. 26, 2001, 5 pages.

"I/B/E/S Active Express", I/B/E/S International Inc., 1999, 2 pp.

Lawrence D. Brown et al., "The Superiority of Analyst Forecasts as Measures of Expectations: Evidence from Earnings", *The Journal of Finance*, vol. XXXIII, No. 1, Mar. 1978, pp. 1-16.

Lawrence D. Brown et al., "The Predictive Value of Interim Reports for Improving Forecasts of Future Quarterly Earnings", *The Accounting Review*, vol. LIV, No. 3, Jul. 1979, pp. 585-591.

Lawrence D. Brown, "Analyst Forecasting Errors and Their Implications for Security Analysis: An Alternative Perspective", *Financial Analysts Journal*, Jan.-Feb. 1996, pp. 40-47.

Lawrence D. Brown et al., "Analysts can Forecast Accurately!" *The Journal of Portfolio Management*, Spring 1980, pp. 31-34.

L. D. Brown et al., "Perspectives on Forecasting Research in Accounting and Finance" *Journal of Forecasting*, vol. 2, 1983, pp. 325-330.

Robert E. Hoskin et al., "Evidence on the Incremental Information Content of Additional Firm Disclosures Made Concurrently with Earnings, " *Journal of Accounting Research*, vol. 24 Supplement 1986, pp. 1-32.

Lawrence D. Brown, "Earnings Surprise Research: Synthesis and Perspectives",*Financial Analysts Journal*, Mar./Apr. 1997, pp. 13-19.

Charles M. C. Lee et al., "What is the Intrinsic Value of the Dow?", *The Journal of Finance*, vol. LIV, No. 5, Oct. 1999, pp. 1693-1741.

Charles M. C. Lee, "Market Integration and Price Execution for NYSE-Listed Securities", *The Journal of Finance*, vol. XLVIII, No. 3, Jul. 1993, pp. 1009-1038.

Charles M. C. Lee et al., "Volume, Volatility, and New York Stock Exchange Trading Halts", *The Journal of Finance*, vol. XLIX, No. 1, Mar. 1994, pp. 183-214.

Navin Chopra et al., "Summing Up", *The Journal of Finance* vol. XLVIII, No. 2, Jun. 1993, pp. 811-812.

Navin Chopra et al., "Yes, Discounts on Closed-End Funds are a Sentiment Index" *The Journal of Finance*, vol. XLVIII, No. 2, Jun. 1993, pp. 801-808.

Charles M. C. Lee et al., "Spreads, Depths, and the Impact of Earnings Information: An Intraday Analysis", *The Review of Financial Studies*, vol. 6, No. 2, 1993, pp. 345-374.

Sati P. Bandyopadhyay et al., "Analysts' Use of Earnings Forecasts in Predicting Stock Returns: Forecast Horizon Effects", *International Journal of Forecasting*, vol. 11, No. 3, 1995, pp. 429-445.

Lawrence D. Brown, "Influential Accounting Articles, Individuals, Ph.D. Granting Institutions and Faculties: A Citational Analysis", *Accounting, Organizations and Society*, vol. 21, No. 7/8, Oct./Nov. 1996, pp. 723-754.

Lawrence D. Brown et al., "Security Analyst Superiority Relative to Univariate Time-Series Models in Forecasting Quarterly Earnings", *Journal of Accounting and Economics*, vol. 9, 1987, pp. 61-87.

Lawrence D. Brown et al., "An Evaluation of Alternative Proxies for the Market's Assessment of Unexpected Earnings", *Journal of Accounting and Economics*, vol. 9, 1987, pp. 159-193.

Lawrence D. Brown et al., "The Impact of Annual Earnings Announcements on Convergence of Beliefs", *The Accounting Review*, vol. 67, No. 4, Oct. 1992, pp. 862-875.

Lawrence D. Brown, "Analyst Forecasting Errors: Additional Evidence" *Financial Analysts Journal*, Nov./Dec. 1997, pp. 81-88.

Praveen Sinha of et al., "A Re-Examination of Financial Analysts Differential Earnings Forecast Accuracy", *Contemporary Accounting Research*, The Journal of Canadian Academic Accounting Association, vol. 14, No. 1, Spring 1997, pp. 1-42.

Leonard C. Soffer et al., "Post-Earnings Announcement Drift and the Dissemination of Predictable Information", *Contemporary Accounting Research*, The Journal of Canadian Academic Accounting Association, vol. 16, No. 2, Summer 1999, pp. 305-331.

Jacob K. Thomas, "Discussion of "Post-Earnings Announcement Drift and the Dissemination of Predictable Information, *Contemporary Accounting Research*, The Journal of Canadian Academic Accounting Association, vol. 16, No. 2, Summer 1999, pp. 333-340.

Lawrence D. Brown, "Comment on Post-Earnings Announcement Drift and the Dissemination of Predictable Information", *Contemporary Accounting Research*, The Journal of Canadian Academic Accounting Association, vol. 16, No. 2, Summer 1999, pp. 341-345.

Lawrence D. Brown et al, "Univariate Time-Series Models of Quarterly Accounting Earnings per Share: A Proposed Model", *Journal of Accounting Research* vol. 17, No. 1, Spring 1979, pp. 179-189.

Lawrence D. Brown, "Earnings Forecasting Research: Its Implications for Capital Markets Research", *International Journal of Forecasting*, vol. 9, 1993, pp. 295-320.

J. O'Hanlon, Commentary on: Lawrence D. Brown "Earnings Forecasting Research: Its Implications for Capital Markets Research", *International Journal of Forecasting*, vol. 9, 1993, pp. 321-323.

Jacob K. Thomas, "Comments on 'Earnings Forecasting Research: Its Implications for Capital Markets Research'", *International Journal of Forecasting*, vol. 9, 1993, pp. 325-330.

Philip Brown, "Comments on 'Earnings Forecasting Research: Its Implications for Capital Markets Research'", *International Journal of Forecasting*, vol. 9, 1993, pp. 331-335.

Mark E. Zmijewski, "Comments on 'Earnings Forecasting Research: Its Implications for Capital Markets Research' by L. Brown", *International Journal of Forecasting*, vol. 9, 1993, pp. 337-342.

Lawrence D. Brown, Reply to Commentaries on "Earnings Forecasting Research: Its Implications for Capital Markets Research", *International Journal of Forecasting*, vol. 9, 1993, pp. 343-344.

Lawrence D. Brown, "A Test of the Reliability of Current Cost Disclosures" *Abacus—A Journal of Accounting, Finance and Business Studies*, vol. 30, No. 1, Mar. 1994, pp. 2-17.

Lawrence D. Brown, "The Impact of Announcement Timing on the Informativeness of Earnings and Dividends", *Journal of Accounting, Auditing & Finance*, vol. 9, No. 4, Fall 1994, pp. 653-674.

Lawrence D. Brown et al., "The Familiarity with and Perceived Quality of Accounting Journals: Views of Senior Accounting Faculty in Leading U.S. MBA Programs", *Contemporary Accounting Research*, The Journal of Canadian Academic Accounting Association, vol. 11, No. 1-I, Summer 1994, pp. 223-250.

Adrian P. Fitzsimons, et al., "Harmonizing GAAP Differences Among the NAFTA Countries", *The CPA Journal*, May 1995, pp. 43-44.

Lawrence D. Brown, "Book Review of M. Metcalf's 1995 *Forecasting Profit*" *International Journal of Forecasting*, vol. 12, No. 1, 1996, pp. 176-177.

Lawrence D. Brown et al., "An Information Interpretation of Financial Analyst Superiority in Forecasting Earnings", *Journal of Accounting Review*, vol. 25, No. 1, Spring 1997, pp. 49-67.

Lawrence D. Brown, "Forecast Selection When All Forecasts are not Equally Recent", *International Journal of Forecasting*, vol. 7, No. 3, 1991, pp. 349-356.

Lawrence D. Brown et al., "Capsules and Comments", *Journal of Accounting Research*, vol. 29, No. 2, Autumn 1991, pp. 382-385.

Lawrence D. Brown et al., "Applying Citation Analysis to Evaluate the Research Contributions of Accounting Faculty and Doctoral Programs", *The Accounting Review*, vol. LX, No. 2, Apr. 1985, pp. 262-277.

Lawrence D. Brown, "Can ESP Yield Abnormal Returns?", *The Journal of Portfolio Management*, vol. 23, No. 4, Summer 1997, pp. 36-43.

Lawrence D. Brown et al., "Do Stock Prices Fully Reflect the Implications of Current Earnings for Future Earnings for ARI Firms?", *Journal of Accounting Research* vol. 38, No. 1, Spring 2000, pp. 149-164.

Lawrence D. Brown et al., "The Association Between Nonearnings Disclosures by Small Firms and Positive Abnormal Returns", *The Accounting Review* vol. 68, No. 3, Jul. 1993, pp. 668-680.

Lawrence D. Brown et al., "Adaptive Expectations, Time-Series Models, and Analysis Forecast Revision", *Journal of Accounting Research*, vol. 17, No. 2, Autumn 1979, pp. 341-351.

Lawrence D. Brown et al., "Does the FASB Listen to Corporations?" *Journal of Business Finance & Accounting*, vol. 19, No. 5, Sep. 1992, pp. 715-731.

Lawrence D. Brown et al., "Using Citation Analysis to Assess the Impact of Journals and Articles on Contemporary Accounting Research (CAR)", *Journal of Accounting Research*, vol. 23, No. 1, Spring 1985, pp. 84-109.

Kaushik I. Amin et al., "Option Trading, Price Discovery, and Earnings News Dissemination", *Contemporary Accounting Research*, The Journal of Canadian Academic Accounting Association, vol. 14, No. 2, Summer 1997, pp. 153-192.

Charles M. C. Lee et al., "Investor Sentiment and the Closed-End Fund Puzzle", *The Journal of Finance*, vol. XLVI, No. 1, Mar. 1991, pp. 75-109.

Carolyn M. Callahan et al, "Accounting Information and Bid-Ask Spreads", *Accounting Horizons*, vol. 11, No. 4, Dec. 1997, pp. 50-60.

Charles M. C. Lee, "Accounting-Based Valuation: Impact on Business Practices and Research", *Accounting Horizons*, vol. 13, No. 4, Dec. 1999, pp. 413-425.

Richard Frankel et al., "Accounting Valuation, Market Expectation, and Cross-Sectional Stock Returns" *Journal of Accounting and Economics*, vol. 25, No. 3, Jun. 1998, pp. 283-319.

Ronald King et al., "Corporate Disclosure and Price Discovery Associated with NYSE Temporary Trading Halts", *Contemporary Accounting Research*, The Journal of Canadian Academic Accounting Association, vol. 8, No. 2, Spring 1992, pp. 509-531.

Charles M. C. Lee, "Discussion of "Corporate Disclosure and Price Discovery Associated with NYSE Temporary Trading Halts"", *Contemporary Accounting Research*, The Journal of Canadian Academic Accounting Association, vol. 8, No. 2, Spring 1992, pp. 532-539.

Charles M. C. Lee, "Measuring Wealth", *CA Magazine*, Apr. 1996, pp. 32-37.

Charles M. C. Lee et al., "Inferring Trade Direction from Intraday Data", *The Journal of Finance*, vol. XLVI, No. 2, Jun. 1991, pp. 733-746.

Charles M. C. Lee et al., "Price Momentum and Trading Volume", *The Journal of Finance*, vol LV, No. 5, Oct. 2000, pp. 2017-2069.

Charles M. C. Lee et al., "Valuing the Dow: A Bottom-Up Approach", *Financial Analysts Journal*, vol. 55, No. 5, Sep./Oct. 1999, pp. 4-23.

Charles M. C. Lee, "Earnings News and Small Traders", *Journal of Accounting and Economics*, vol. 15, No. 2/3, Jun./Sep. 1992, pp. 265-302.

Terry D. Warfield et al., "Response to the FASB Exposure Draft, "Proposed Statement of Financial Accounting Standards—Accounting for Transfers and Servicing of Financial Assets and Extinguishment of Liabilities"", *Accounting Horizons*, vol. 10, No. 3, Sep. 1996, pp. 178-181.

Terry D. Warfield et al., "Response to the FASB Exposure Draft, "Proposed Statement of Financial Accounting Standards—Accounting for Certain Liabilities Related to Closure or Removal of Long-Lived Assets"", *Accounting Horizons*, vol. 10, No. 4, Dec. 1996, pp. 137-141.

Terry D. Warfield et al., "Response to the FASB Exposure Draft, "Proposed Statement of Financial Accounting Standards—Consolidated Financial Statements: Policy and Procedures"", *Accounting Horizons*, vol. 10, No. 3, Sep. 1996, pp. 182-185.

Lawrence D. Brown et al., "Profiting from Predicting Earnings Surprise", *The Journal of Financial Statement Analysis*, Winter 1998, pp. 57-66.

Martin M. Herzberg et al., "Enhancing Earnings Predictability Using Individual Analyst Forecasts", *The Journal of Investing*, Summer 1999, pp. 15-24.

Susan D. Krische et al., "The Information Content of Analyst Stock Recommendations", First Draft: Aug. 8, 2000, Current Draft: Sep. 25, 2000, 40 pages.

www.findarticles.com/m4PRN/1999_Oct_14/56284107/pl/article.jhtml, printed Feb. 5, 2001, 2 pages.

http://my.zacks.com/?Alert=www.zacks.com, printed Feb. 2, 2001, 6 pages.

http://www.cianet.com/, printed Feb. 5, 2001, 14 pages.

http://www.factset.com/, printed Feb. 5, 2001, 10 pages.

http://www.iexchange.com/, printed Feb. 5, 2001, 50 pages.

http://www.validea.com/home/home.asp, printed Feb. 5, 2001, 26 pages.

http://www.bulldogresearch.com/default.asp, printed Feb. 5, 2001, 28 pages.

Lawrence D. Brown, "Predicting Individual Analyst Earnings Forecast Accuracy", Sep. 29, 1999, pp. 1-60.

Brown et al., "Composite Analyst Earnings Forecasts: The Next Generation", *Journal of Business Forecasting*, Summer 1990, vol. 9, Issue 2.

Ho et al, "Market Reactions to Messages from Brokerage Ratings Systems", *Financial Analysts Journal*, Feb. 1998, vol. 54, Issue 1.

Lamonica, "The Best and Worst: Bloomberg's Second Annual Analysts Survey, and the Top Analysts Top Picks", *Financial World*, Jan. 30, 1996, vol. 165, Issue 2.

http://interactive.wsj.com/public/current/summaries/best00.htm (Jan. 5, 2001).

http://interactive.wsj.com/public/current/articles/SB963945297966625438.htm (Jan. 5, 2001).

http://interactive.wsj.com/public/current/articles/SB963945742428637569.htm (Jan. 5, 2001).

http://interactive.wsj.com/public/current/articles/SB963945478117361937.htm (Jan. 5, 2001).

http://interactive.wsj.com/public/current/articles/SB963944657420928118.htm (Jan. 5, 2001).

http://interactive.wsj.com/public/current/articles/SB963945615772798263.htm (Jan. 5, 2001).

Herzberg et al., "Enhancing Earnings Predictability Using Individual Analyst Forecasts", *The Journal of Investing*, Summer 1999.

Charles Schwab: Schwab Introduces Analytics Funds; Utilizes Quantitative Techniques to Seek Above-Market Returns.

Mozes et al., "Modeling Earnings Expectations Based on Clusters of Analyst Forecasts", *The Journal of Investing*, Spring 1999.

Lobo et al., "Analysts' Utilization of Historical Earnings Information", *Managerial and Decision Economics*, vol. 12, Oct. 1991, pp. 383-393.

\* cited by examiner

| Interval | Interval Start Date | Stock 1 | Stock 2 | Stock 3 | Stock 4 |
|---|---|---|---|---|---|
| Interval 1 | 1/1/01 | P | nr | NG | nr |
| Interval 2 | 1/4/01 | P | nr | NT | nr |
| Interval 3 | 2/12/01 | P | NG | NT | P |
| Interval 4 | 3/17/01 | nr | P | P | P |
| Interval 5 | 4/6/01 | P | P | P | P |
| Interval 6 | 6/29/01 | P | NG | P | NT |
| Interval 7 | 9/5/01 | P | NG | nr | NT |
|  | 9/30/01 | nr | NG | nr | NG |

SP : Stronger Positive
P : Positive
NT : Neutral
nr : No Rating

*Adjusted Security Price History*

| Interval Start Date | Stock 1 | Stock 2 | Stock 3 | Stock 4 | Proxy |
|---|---|---|---|---|---|
| 1/1/01 | 50 | 50 | 50 | 75 | 100 |
| 1/4/01 | 50 | 50 | 52 | 77 | 100 |
| 2/12/01 | 49 | 51 | 55 | 78 | 100 |
| 3/17/01 | 48 | 52 | 60 | 80 | 100 |
| 4/6/01 | 47 | 52 | 60 | 78 | 100 |
| 6/29/01 | 47 | 55 | 65 | 77 | 100 |
| 9/5/01 | 45 | 55 | 70 | 75 | 100 |
| 9/30/01 | 45 | 60 | 75 | 73 | 100 |

*Security-Interval Returns*

| | Interval Start Date | Stock 1 | Stock 2 | Stock 3 | Stock 4 | RFS |
|---|---|---|---|---|---|---|
| 1 | 1/1/01 | 0.000 | 0.000 | 4.000 | 2.667 | 0 |
| 2 | 1/4/01 | -2.000 | 2.000 | 5.769 | 1.299 | 0 |
| 3 | 2/12/01 | -2.041 | 1.961 | 9.091 | 2.564 | 0 |
| 4 | 3/17/01 | -2.083 | 0.000 | 0.000 | -2.500 | 0 |
| 5 | 4/6/01 | 0.000 | 5.769 | 8.333 | -1.282 | 0 |
| 6 | 6/29/01 | -4.255 | 0.000 | 7.692 | -2.597 | 0 |
| 7 | 9/5/01 | 0.000 | 9.091 | 7.143 | -2.667 | 0 |
| | 9/30/01 | | | | | |

(Step 7)

FIG. 1D

*Benchmark Portfolio Weighting Rule*
*(Predetermined but Changeble by StarMine)*

*Benchmark Portfolio Return*

| Recommendation Level | Weight |
|---|---|
| ... | |
| ... | |
| Stronger Positive | S |
| Positive | S |
| Neutral | S |
| Negative | S |
| Stronger Negative | S |
| ... | |
| ... | |

*Security - Interval Recommendations*

5) Generate Coverage Constituents Weights

*Security Size History*   Optional

| Interval Start Dates | Stock 1 | Stock 2 | Stock 3 | Stock 4 |
|---|---|---|---|---|
| 1/1/01 | 100B | 100M | 10M | 50B |
| 1/4/01 | 99B | 101M | 10M | 51B |
| 2/12/01 | 98B | 103M | 11M | 52B |
| 3/17/01 | 85B | 105M | 12M | 53B |
| 4/6/01 | 84B | 105M | 12M | 52B |
| 6/29/01 | 83B | 110M | 13M | 61B |
| 9/5/01 | 80B | 110M | 14M | 60B |
| 9/30/01 | 90B | 120M | 15M | 49B |

*Coverage Constituent Weights*

| Interval | Interval Start Date | Stock 1 | Stock 2 | Stock 3 | Stock 4 | Sum |
|---|---|---|---|---|---|---|
| Interval 1 | 1/1/01 | 0.5 | 0 | -0.5 | 0 | 1 |
| Interval 2 | 1/4/01 | 0.5 | 0 | 0.5 | 0 | 1 |
| Interval 3 | 2/12/01 | 0.25 | -0.25 | 0.25 | 0.25 | 1 |
| Interval 4 | 3/17/01 | 0 | 0.33 | 0.33 | 0.33 | 1 |
| Interval 5 | 4/6/01 | 0.25 | 0.25 | 0.25 | 0.25 | 1 |
| Interval 6 | 6/29/01 | 0.25 | -0.25 | 0.25 | 0.25 | 1 |
| Interval 7 | 9/5/01 | 0.33 | -0.33 | 0 | 0.33 | 1 |
|  | 9/30/01 |  |  |  |  |  |

*Benchmark Portfolio Constituent Rule*
*(Predetermined but Changeble by StarMine)*

| Recommendation Level | Constituent |
|---|---|
| . . . |  |
| . . . |  |
| Stronger Positive | Security |
| Positive | Security |
| Neutral | Security |
| Negative | Security |
| Stronger Negative | Security |
| . . . |  |
| . . . |  |

6) Generate Portfolio Constituents and Apply Coverage Constituents Weights to Each Portfolio Constituents

*Portfolio Constituents and Weights*

| Interval | Interval Start Date | Stock 1 | Stock 2 | Stock 3 | Stock 4 | Proxy | Sum |
|---|---|---|---|---|---|---|---|
| Interval 1 | 1/1/01 | 0.5 | 0 | -0.5 | 0 | 0 | 1 |
| Interval 2 | 1/4/01 | 0.5 | 0 | 0.5 | 0 | 0 | 1 |
| Interval 3 | 2/12/01 | 0.25 | -0.25 | 0.25 | 0.25 | 0 | 1 |
| Interval 4 | 3/17/01 | 0 | 0.33 | 0.33 | 0.33 | 0 | 1 |
| Interval 5 | 4/6/01 | 0.25 | 0.25 | 0.25 | 0.25 | 0 | 1 |
| Interval 6 | 6/29/01 | 0.25 | -0.25 | 0.25 | 0.25 | 0 | 1 |
| Interval 7 | 9/5/01 | 0.33 | -0.33 | 0 | 0.33 | 0 | 1 |
|  | 9/30/01 |  |  |  |  |  |  |

(Step 7)

*Portfolio Constituents and Weights*

| Interval | Interval Start Date | Stock 1 | Stock 2 | Stock 3 | Stock 4 | Proxy | Sum |
|---|---|---|---|---|---|---|---|
| Interval 1 | 1/1/01 | 0.5 | 0 | -0.5 | 0 | 0 | 1 |
| Interval 2 | 1/4/01 | 0.5 | 0 | 0 | 0 | 0.5 | 1 |
| Interval 3 | 2/12/01 | 0.25 | -0.25 | 0 | 0.25 | 0.25 | 1 |
| Interval 4 | 3/17/01 | 0 | 0.33 | 0.33 | 0.33 | 0 | 1 |
| Interval 5 | 4/6/01 | 0.25 | 0.25 | 0.25 | 0.25 | 0 | 1 |
| Interval 6 | 6/29/01 | 0.25 | -0.25 | 0.25 | 0 | 0.25 | 1 |
| Interval 7 | 9/5/01 | 0.33 | -0.33 | 0 | 0 | 0.33 | 1 |
|  | 9/30/01 |  |  |  |  |  |  |

(Step 7)

FIG. 2F

Raw Security-Interval Returns → Ⓐ
(Step 4)

*Weighted Security-Interval Returns*

| Interval | Interval Start Date | Stock 1 | Stock 2 | Stock 3 | Stock 4 | Proxy |
|---|---|---|---|---|---|---|
| Interval 1 | 1/1/01 | 0.000 | 0.000 | -2.000 | 0.000 | 0.000 |
| Interval 2 | 1/4/01 | -1.000 | 0.000 | 2.885 | 0.000 | 0.000 |
| Interval 3 | 2/12/01 | -0.510 | -0.490 | 2.273 | 0.641 | 0.000 |
| Interval 4 | 3/17/01 | 0.000 | 0.000 | 0.000 | -0.825 | 0.000 |
| Interval 5 | 4/6/01 | 0.000 | 1.442 | 2.083 | -0.321 | 0.000 |
| Interval 6 | 6/29/01 | -1.064 | 0.000 | 1.923 | -0.649 | 0.000 |
| Interval 7 | 9/5/01 | 0.000 | -3.000 | 0.000 | -0.880 | 0.000 |
|  | 9/30/01 |  |  |  |  |  |

← Ⓑ

→ Ⓒ

*Weighted Interval Portfolio Returns*

| Interval | Percent Return |
|---|---|
| Interval 1 | -2.000 |
| Interval 2 | 1.885 |
| Interval 3 | 1.913 |
| Interval 4 | -0.825 |
| Interval 5 | 3.205 |
| Interval 6 | 0.210 |
| Interval 7 | -3.880 |

← Ⓓ

→ Ⓔ

*Portfolio Returns*

| 0.3% |
|---|

Ⓗ ◄—— Raw Security-Interval Returns
(Step 4)

*Weighted Security-Interval Returns*

Ⓘ ►

| Interval | Interval Start Date | Stock 1 | Stock 2 | Stock 3 | Stock 4 | Proxy |
|---|---|---|---|---|---|---|
| Interval 1 | 1/1/01 | 0.000 | 0.000 | -2.000 | 0.000 | 0.000 |
| Interval 2 | 1/4/01 | -1.000 | 0.000 | 0.000 | 0.000 | 0.000 |
| Interval 3 | 2/12/01 | -0.510 | -0.490 | 0.000 | 0.641 | 0.000 |
| Interval 4 | 3/17/01 | 0.000 | 0.000 | 0.000 | -0.825 | 0.000 |
| Interval 5 | 4/6/01 | 0.000 | 1.442 | 2.083 | -0.321 | 0.000 |
| Interval 6 | 6/29/01 | -1.064 | 0.000 | 1.923 | 0.000 | 0.000 |
| Interval 7 | 9/5/01 | 0.000 | -3.000 | 0.000 | 0.000 | 0.000 |
|  | 9/30/01 |  |  |  |  |  |

Ⓙ ◄

*Weighted Interval Portfolio Returns*

| Interval | Percent Return |
|---|---|
| Interval 1 | -2.000 |
| Interval 2 | -1.000 |
| Interval 3 | -0.359 |
| Interval 4 | -0.825 |
| Interval 5 | 3.205 |
| Interval 6 | 0.859 |
| Interval 7 | -3.000 |

Ⓚ ►

Ⓛ ◄

*Portfolio Returns*

Ⓜ ► -3.2%

Ⓝ

*Value Add*

| Firmwide | Analyst: -Select One- | Industry - | Ticker: | | Preferences | Help |

Performance Mine-ders

Firmwide Performance Summary

Of Analysts Ratings and Estimates Through May 09 02

Recommendation Return: T3M T6M T12M T24M 2001    Estimate Accuracy: 1FQ 4FQ 8FQ 1FY 2FY 3FY 2000FQ 2001FQ Summary

| Analyst | # of Stocks | Recommendation Return (T12M) | | | Estimate Accuracy (4FQ) | | |
|---|---|---|---|---|---|---|---|
| | | Coverage Return[1] | Active Return[2] | Analyst Value Add[3] ▼ | # of Stocks | Score | Rating |
| Analyst, Drake | 19 | -62% | -25% | 36% | 18 | 38 | ★★★★★ |
| Analyst, Mark | 6 | 2% | 7% | 4% | 5 | 44 | ★★★★★ |
| Analyst, Doug | 1 | -40% | -40% | 0% | 1 | 55 | ★★★★★ |
| Analyst, Michael S | 15 | 18% | 18% | 0% | 2 | 51 | ★★★★★ |
| Analyst, Ann | 26 | 27% | 21% | -6% | 25 | 21 | ★★★★★ |
| Analyst, David M | 12 | 41% | 35% | -6% | 4 | 40 | ★★★★★ |
| Analyst, Robert F | 20 | 24% | 14% | -9% | 14 | 59 | ★★★★★ |
| Analyst, David D[ab] | 19 | 44% | 34% | -10% | 15 | 52 | ★★★★★ |
| Analyst, George | 10 | -3% | -20% | -17% | 7 | 58 | ★★★★★ |

Download this page                                                                                              Print this page

[1] Coverage Return: A benchmark portfolio return based on holding the universe of stocks covered by the analyst. For the time period indicated, a portfolio is constructed by purchasing 1 dollar unit of each of the stocks on which the analyst had a rating. Each stock is included in the portfolio for the time that the analyst had a rating on it and is weighted equally, regardless of the rating. The portfolio is rebalanced each month and each time an analyst adds coverage, drops coverage, or changes rating.

[2] Active Return: A simulated portfolio return based on actively following the analyst's ratings on their covered stocks. For the time period indicated, a portfolio is constructed by purchasing 2 dollar units of each "strong buy"-rated stock, purchasing 1 dollar units of each "buy"-rated stocks, purchasing 1 dollar units of cash for each "hold"-rated stock, and shorting 1 dollar unit of each "sell" or "strong sell"-rated stock. The portfolio is rebalanced each month and each time an analyst adds coverage, drops coverage, or changes rating.

[3] Value Add: Active Return minus Coverage Return.

[ab] Performance for this analyst is derived from coverage at more than one broker.

FIG. 4

METHODS AND SYSTEMS FOR MEASURING PERFORMANCE OF A SECURITY ANALYST

CROSS REFERENCE TO RELATED APPLICATIONS

This application claims the benefit of U.S. Provisional Patent Application Ser. No. 60/327,050, filed Oct. 3, 2001, which application is fully incorporated herein by reference.

BACKGROUND

1. Field of the Invention

This invention relates generally to systems, and their methods of use, that measure actual performance of a security analyst, and more particularly to systems, and their methods of use that measure performance of a security analyst's recommendations using a value add that is determined by subtracting a return of a benchmark portfolio from a return of a simulated portfolio return and then multiplied by an adjustment factor.

2. Description of the Related Art

Many individuals and institutions analyze financial data, financial instruments, such as equity and fixed-income securities, and other things, at least in part to predict future economic events. Such individuals may include, for example, security analysts. The role of the security analyst is generally well-known and includes, among other things, issuing earnings estimates or recommendations on whether investors should buy, sell, or hold financial instruments, such as equity securities, and other predictions. Security analyst estimates may include, but are not limited to, quarterly, semi-annual, and annual earnings estimates for companies whether or not they are traded on a public securities exchange.

For each security an analyst covers, the analyst issues a "recommendation" or "rating" on the security. This recommendation or rating on serves as a recommendation as to whether to own or weight, relative to a neutral baseline level, holdings of a particular security during a particular time period. Different entities use different language and sometimes different number of levels of recommendations.

Usually more than one analyst follows a given security. Analysts often disagree on earnings estimates and recommendations and, as a result, analysts' earnings estimates and recommendations often vary.

A number of financial information services providers ("FISPs") gather and report analysts' earnings estimates and recommendations. At least some FISPs report the high, low, and mean (or consensus) earnings estimates, as well as mean recommendations for equity securities (as translated to an FISP's particular scale, for example, one to five). In addition, FISPs may also provide information on what the earnings estimates and recommendations were at historical points in time including, but not limited to seven and thirty days prior to the most current consensus, as well as the differences between the consensus (e.g., consensus growth or consensus P/E) for a single equity security and that of the relevant industry.

For some clients, FISPs provide earnings estimates and recommendations on an analyst-by-analyst basis. An advantage of the availability of analyst-level estimates and recommendations is that a client may view the components of the mean estimate or recommendation by analyst. FISP's also work with the employers of the analysts to standardize the firms ratings to a single scale.

One method for determining estimates utilizes a software program that displays all current estimates. For a selected fiscal period security, the software provides the ability to simply "include" or "exclude" each estimate or recommendation from the mean. This is problematic for several reasons. First, commercially available databases of estimates and recommendations contain "current" data on thousands of stocks. Each stock may have estimates from 1 to 70 or more analysts. In addition, each analyst may provide estimates for one or more periods. The data may be updated throughout the day. Manually dealing with this volume of information may be time consuming and tedious.

The actual performance of a security analyst relative to his recommendations on whether investors should buy, sell, or hold financial instruments has been measured by including various degrees of positive recommendations in the construction of a simulated portfolio of securities with these ratings. However, this method fails to address analyst performance on ratings at other levels.

Other methods and systems have utilized a two-tier system using a simulated portfolio calculation that employs a own securities rated positively or don't own securities not rated positively scheme. Additional methods have been utilized with overweight securities rated strong positive over securities rated positive.

Methods and systems to date that measure actual performance of a security analyst typically compare an analyst's security recommendation performance to a benchmark. The purpose of comparing to a benchmark is often to determine the extent to which the analyst's performance was due to his/her abilities versus the extent to which his/her performance was due to external factors. External factors can be the overall market performance and the performance of the types of business covered by the analyst. One approach for selecting a benchmark is to choose an industry group from a published industry scheme, such as Dow Jones, or Morgan Stanley Capital International, as a benchmark. In this case, a published industry group is chosen that corresponds to an industry covered by the analyst.

The published industry consists of a set of securities in related fields of business. The return of this set of securities as a whole is used as a benchmark against which to compare the analyst's performance. A problem with this approach is that industries in published industry grouping schemes vary in their homogeneity with respect to the securities in each grouping. Some industry groupings contain very similar securities or companies in similar lines of business, while others contain companies in widely varying types of business. This results in some securities covered by some analysts that aren't included in their main industry groups. Thus, stocks that fall outside of an industry category will not count toward the performance of that analyst in their main industry group. It also results in the inclusion in an analyst's benchmark portions of an industry group not covered by the analyst.

Current approaches for measuring the performance of security analyst fail to distinguish securities in a portfolio that are rated neutral from those rated negatively. Additionally, current methods and systems fail to incorporate analyst's ratings at levels other than positive and strong positive into the analyst's overall performance calculation. Additionally, existing benchmarks can introduce factors unrelated to the analyst coverage and do not always fully encompass the analyst coverage.

There is a need for methods and systems for measuring performance of a security analyst that distinguishes the treatment of securities rated neutral and those that are rated negatively. There is a further need for methods and systems for measuring performance of a security analyst that incorporate analyst ratings other than strong positive or positive into an overall analyst performance calculation. There is yet a further need for methods and systems for measuring performance of a security analyst that use benchmarks without introducing factors not directly related to the analyst coverage.

SUMMARY

Accordingly, an object of the present invention is to provide methods that are used to evaluate security analyst performances.

Another object of the present invention is to provide methods that create benchmarks which are used to compare the recommendation performance of a security analyst.

Yet another object of the present invention is to provide methods to evaluate security analyst performances that distinguish the treatment of securities with different ratings.

A further object of the present invention is to provide methods to evaluate performance of security analysts utilizing a value add created by subtracting a return of a benchmark portfolio from a return of a simulated portfolio.

Still another object of the present invention is to provide methods to evaluate performance of a security analyst utilizing a value add created by subtracting a return of a benchmark portfolio from a return of a simulated portfolio, where the return of the benchmark portfolio is derived exclusively from a selected set of securities included in the set of securities covered by the analyst.

A further another object of the present invention is to provide methods to evaluate performance of a security analyst utilizing a value add created by subtracting a return of a benchmark portfolio from a return of a simulated portfolio, where the simulated portfolio includes constituents and weights that are a function of the analyst's recommendations on a selected set of securities.

Another object of the present invention is to provide methods to evaluate security analyst performances that distinguish the treatment of securities rated neutral and those rated negatively.

Still another object of the present invention is to provide methods that incorporate analyst ratings other than strong positive or positive into an overall analyst performance calculation.

Yet another object of the present invention is to provide methods that use benchmarks without introducing factors not directly related to an analyst's coverage.

Another object of the present invention is to provide methods that provide visual displays of an analysts overall performance.

Another object of the present invention is to provide methods that provide visual displays of an analyst's performance for a single security.

A further object of the present invention is to provide methods that are used to evaluate security analyst performances for monitoring and compliance applications.

These and other objects of the present invention are achieved in a method for use in measuring performance of a security analyst. An analyst that covers a set of securities, and a performance measurement time period are selected. A benchmark portfolio return is then calculated. The return of the benchmark portfolio is derived exclusively from a selected set of securities that are included in the set of securities covered by the analyst.

In another embodiment of the present invention, a method of measuring performance of a security analyst includes selecting an analyst that covers a set of securities, and a performance measurement time period. A return of a benchmark portfolio is subtracted from a return of a simulated portfolio. The return of the benchmark portfolio is derived exclusively from a selected set of securities that are included in the set of securities covered by the analyst. The simulated portfolio includes constituents and weights that are a function of the analyst's recommendations on the securities in the selected set.

In another embodiment of the present invention, a method of measuring performance of a security analyst includes selecting an analyst that covers a set of securities, and a performance measurement time period. A value add is created by subtracting a return of a benchmark portfolio from a return of a simulated portfolio. The return of the benchmark portfolio is derived exclusively from a selected set of securities that are included in the set of securities covered by the analyst. The simulated portfolio has constituents and weights that are a function of the analyst's recommendations on the securities in the selected set.

In another embodiment of the present invention, a method of measuring performance of a security analyst's recommendations includes creating a value add. The value add is created by subtracting a return of a benchmark portfolio from a return of a simulated portfolio. The return of the benchmark portfolio is derived exclusively from a selected set of securities that are included in the set of securities covered by the analyst. The simulated portfolio includes constituents and weights that are a function of the analyst's recommendations on the securities in the selected set. The value add is then multiplied by an adjustment factor to create a risk adjusted value add. The risk adjusted value add is used to compare different analysts.

In another embodiment of the present invention, a method of measuring performance of a security analyst's includes selecting a performance measurement time period that is divided into a plurality of intervals. A value add is created for each interval by subtracting a return of a benchmark portfolio from a return of a simulated portfolio. The return of the benchmark portfolio is derived exclusively from a selected set of securities that are included in a set of securities covered by the analyst. The simulated portfolio has constituents and weights that are a function of the analyst's recommendations on the securities in the selected set. A portfolio statistic for each interval, and an average value add over all of the intervals are created. An average portfolio statistic is created by averaging portfolio statistics of all intervals. The average value add is divided by the average portfolio statistic to create a risk adjusted value add.

In another embodiment of the present invention, a method of measuring performance of a security analyst's recommendations includes selecting a performance measurement time period that is divided into a plurality of intervals. A value add is created for each of an interval by subtracting a return of a benchmark portfolio from a return of a simulated portfolio. The return of the benchmark portfolio is derived exclusively from a selected set of securities that are included in a set of securities covered by the analyst. The simulated portfolio includes constituents and weights that are a function of the analyst's recommendations on the securities in the selected set. A portfolio statistic is created for each interval. A ratio of value add divided is created by portfolio statistic for at least one interval.

BRIEF DESCRIPTION OF THE DRAWINGS

FIG. 4 is a screenshot illustrating the listing and displaying of individual analysts, and their individual value adds, in one embodiment of the present invention.

DETAILED DESCRIPTION OF THE PREFERRED EMBODIMENTS

Figure 1A:
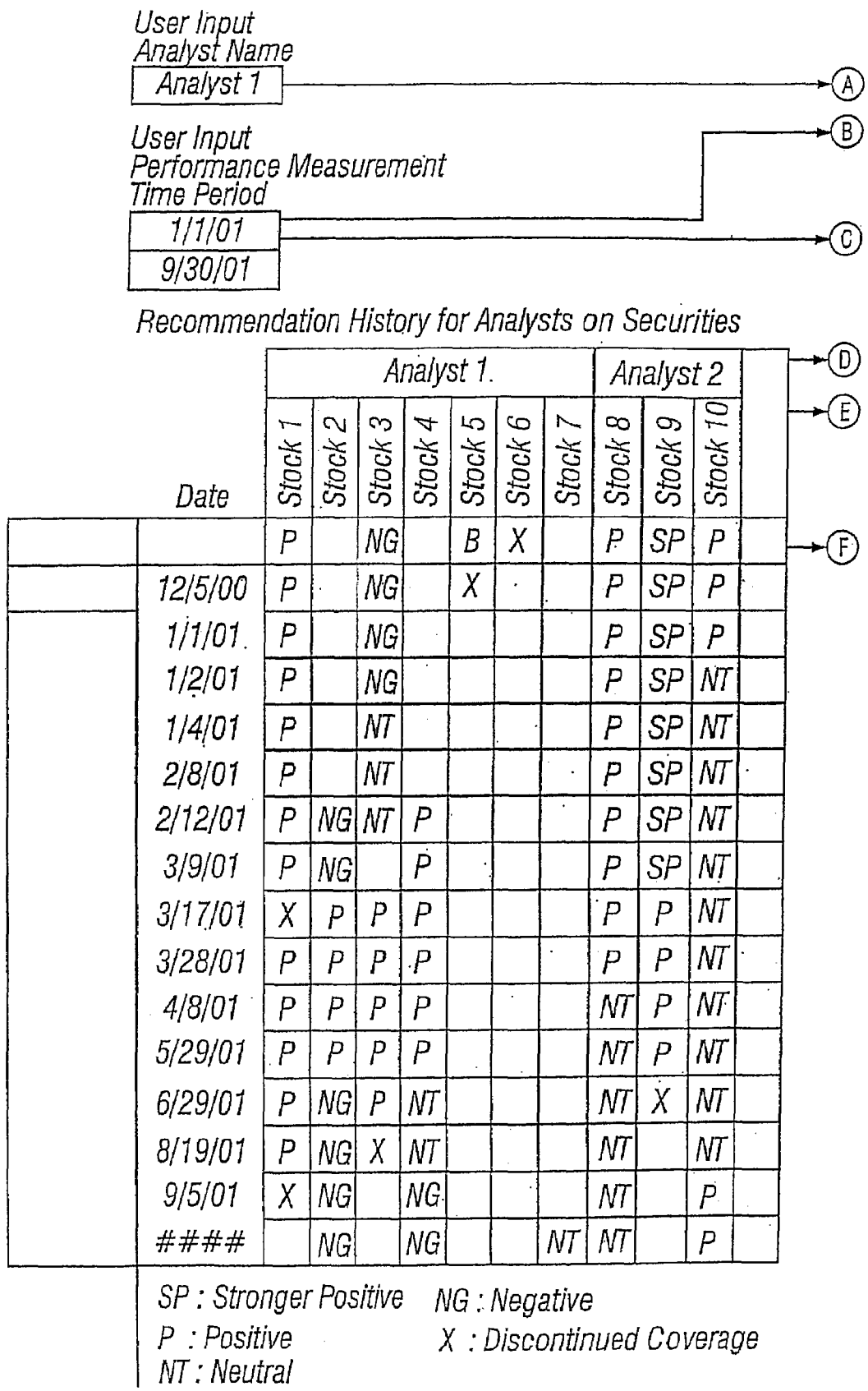
FIGS. 1A through 3C are flow charts that illustrate one embodiment of methods and systems of the present invention that measure performance of one or more security analysts.
Figure 1B:
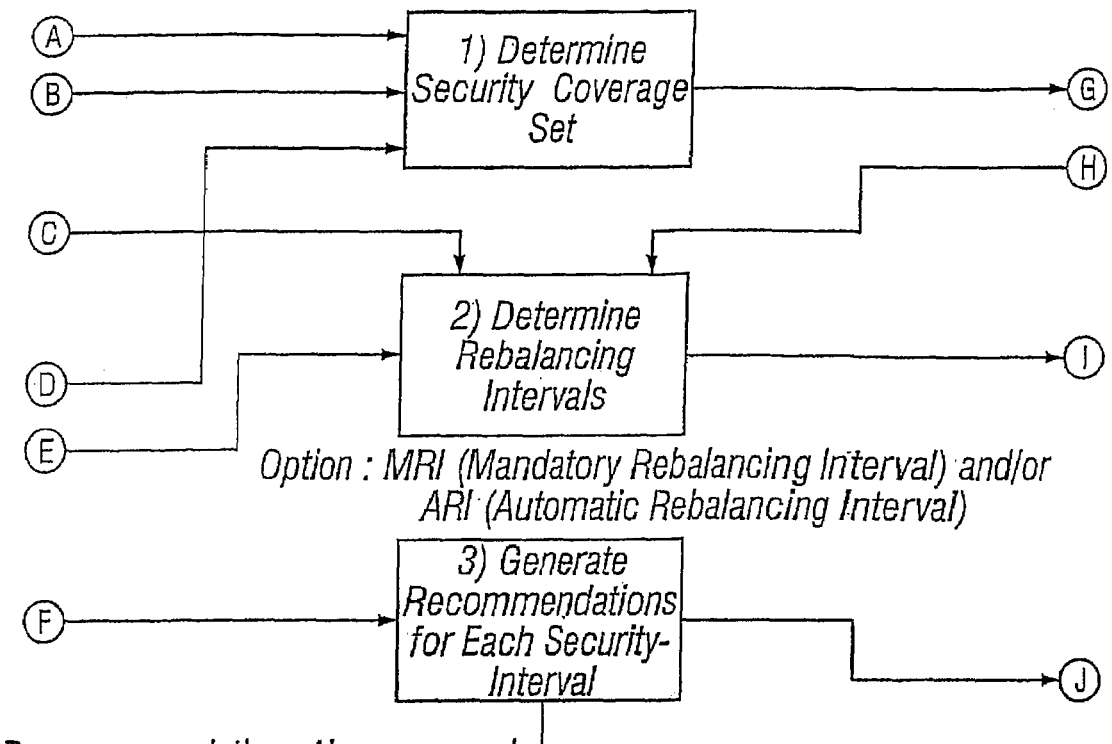
Figure 1C:
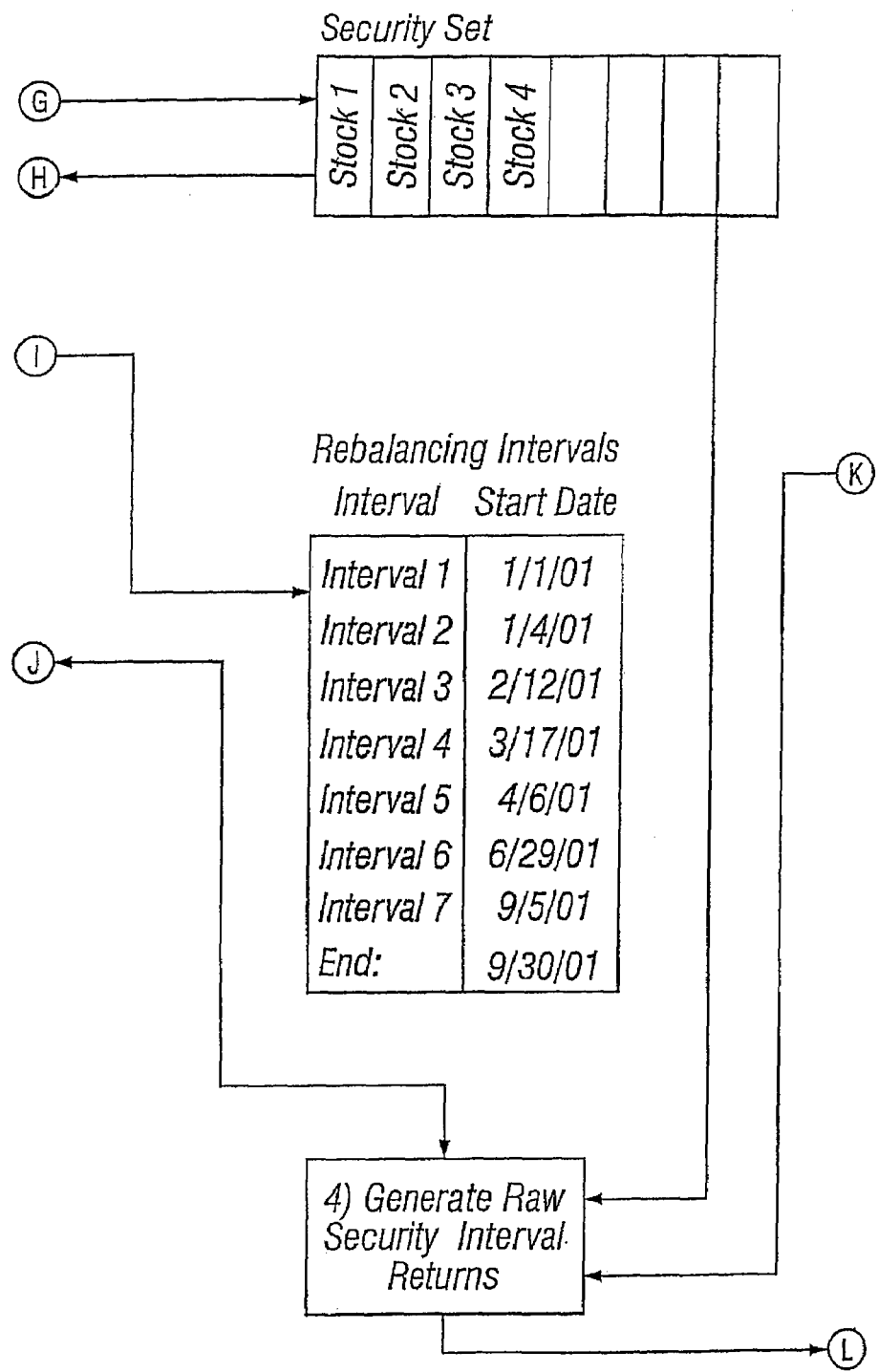
Figure 2B:
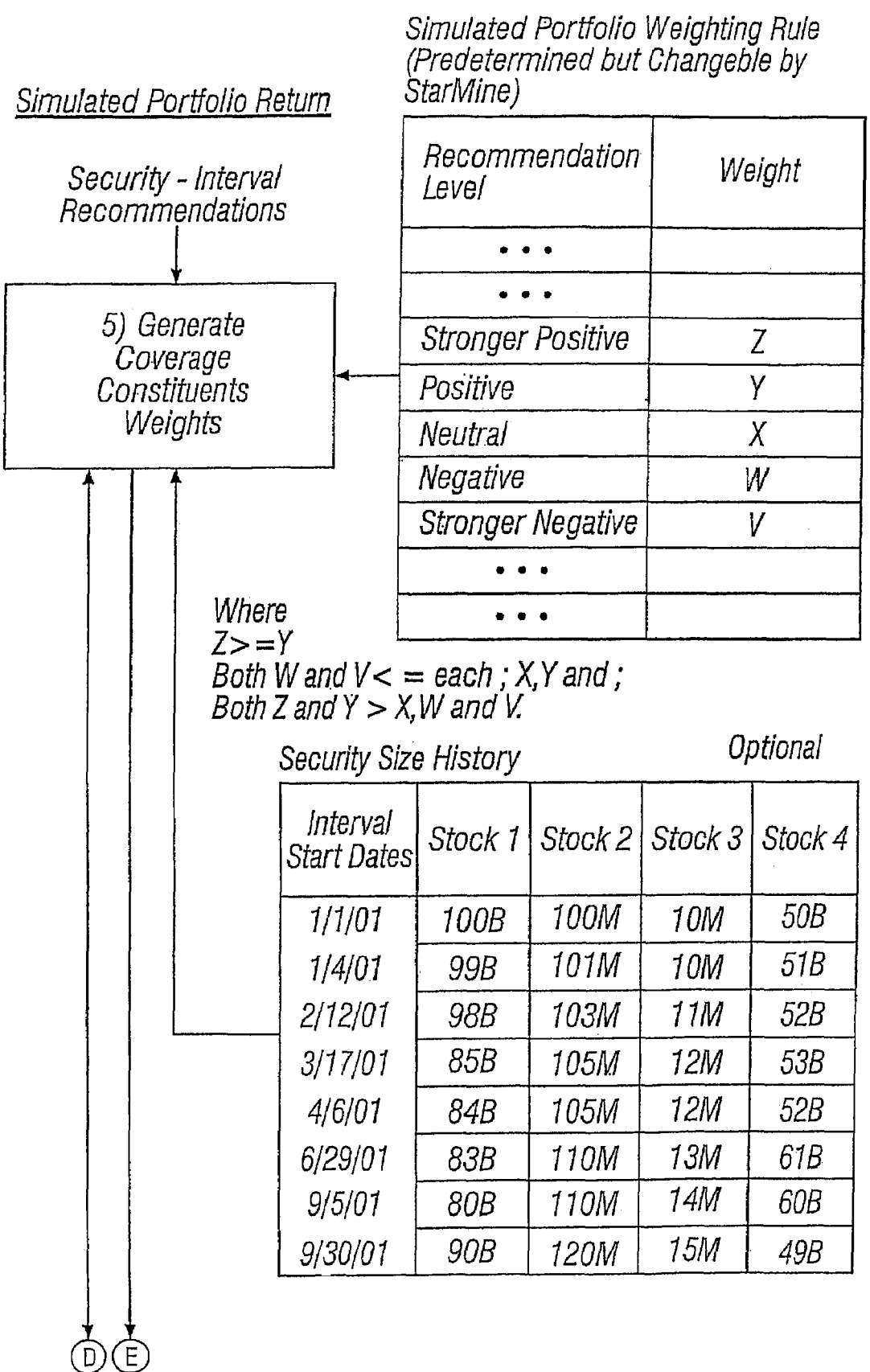
Figure 2D:
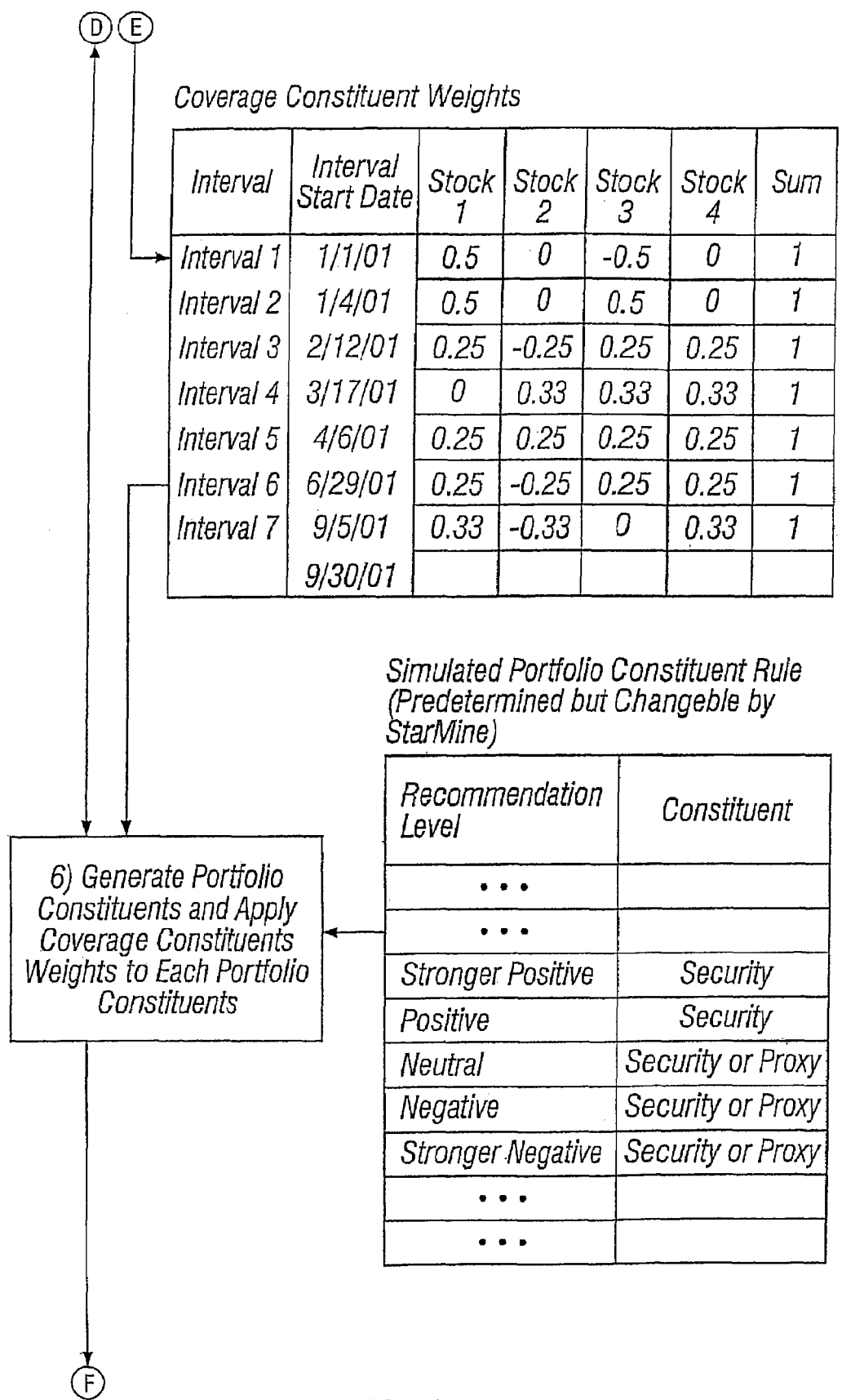
Figure 3B:
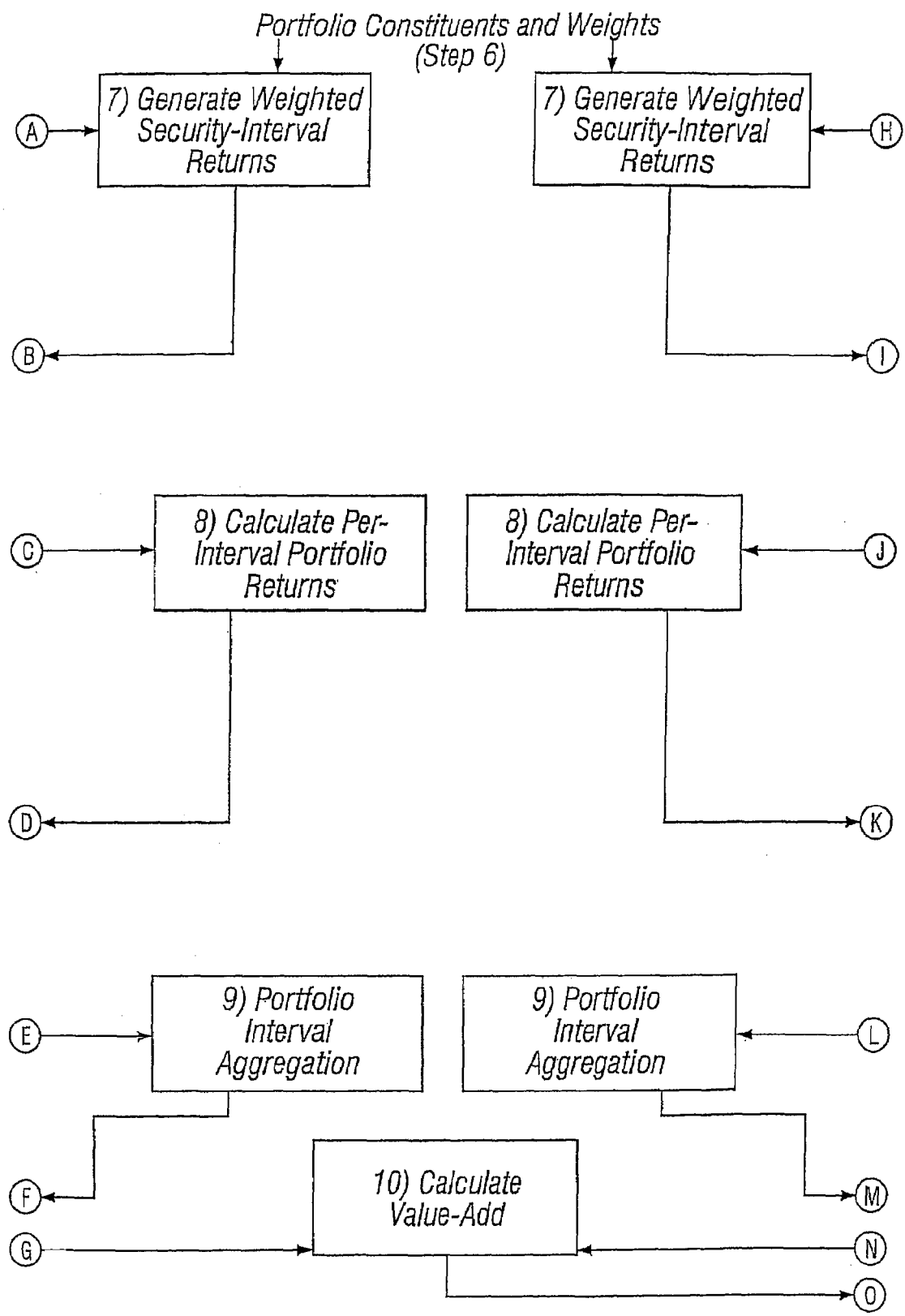

Referring to FIGS. 1A through 3C, one embodiment of the present invention is a method, and a computer implemented system, for use in measuring performance of a security analyst. For purposes of this specification, a security analyst is a person or entity that publishes research reports on securities. In this embodiment, an analyst is selected that covers a set of securities. A performance measurement time period is also selected. A benchmark portfolio return is then calculated. The return of the benchmark portfolio is derived exclusively from a selected set of securities that are included in the set of securities covered by the analyst. The set of securities covered by the analyst includes securities, including but not limited to common stocks and the like, that are assigned to the analyst or that the analyst covers and then publishes research or opinions on those securities that are followed.

The analyst has a securities coverage list that includes those securities on which the analyst has recommendation levels selected from different levels of positive, different levels of negative and can also include a neutral rating. The set of securities covered by the analyst are securities on which the analyst has a recommendation or which are assigned to the analyst. Additionally, the set of securities covered by the analyst includes securities with recommendation levels or no recommendation by the analyst.

A benchmark is used which does not introduce factors not directly related to the analyst coverage. Such factors include securities outside the set of securities covered by the analyst.

These steps are part of a method to then ultimately determine the analyst's securities recommendation performance. A variety of different performance measurement time periods are suitable including but not limited to, calendar month, calendar quarter, calendar year and a 12 month interval of a time period defined by an end date and a duration, a time period defined by a beginning date and an end date, and the like.

In another embodiment of the present invention, a method of measuring performance of a security analyst includes the step of subtracting the return of the benchmark portfolio from a return of a simulated portfolio and multiplying by an adjustment factor. In this embodiment, the return of the benchmark portfolio is again derived exclusively from the selected set of securities that are included in the set of securities covered by the analyst. The simulated portfolio includes constituents and weights that are a function of the analyst's recommendations on the securities in the selected set.

As illustrated in the flowcharts of FIGS. 1A through 3C, another embodiment of the present invention provides a method of measuring performance of a security analyst's recommendations by creating the value add and then multiplying the value add by an adjustment factor to provide for comparison of different analysts. The adjustment factor can be, (i) a function of a weighted average of values that are each representative of a time series variation of a price of each security covered by the analyst, (ii) a value that is representative of the variance across returns of the securities covered by the analyst, (iii) a function of a weighted average of values that are each representative of a time series variation of a price of each security covered by the analyst and a variance across returns of the securities covered by the analyst, (iv) a value that is a function of the extent of security coverage during the performance measurement time period, and the like.

In another embodiment of the present invention, a method of measuring performance of a security analyst's recommendations creates the value add and then multiplies the value add by an adjustment factor in order to compare different analysts. The adjustment factor can be, (i) a function of a weighted average of values that are each representative of a time series variation of a price of each security covered by the analyst, (ii) a value that is representative of the variance across returns of the securities covered by the analyst, (iii) a function of a weighted average of values that are each representative of a time series variation of a price of each security covered by the analyst and a variance across returns of the securities covered by the analyst, (iv) a value that is a function of the extent of security coverage during the performance measurement time period, and the like. In another embodiment, the value add is multiplied by the adjustment factor in order to create a risk adjusted value add to compare different analysts.

For purposes of this specification, the simulated portfolio is a theoretical holding of securities that can be held by anyone. Securities in the simulated portfolio can change over a course of the performance measurement time period. Additionally, the simulated portfolio has a theoretical monetary value that can change over time. The benchmark portfolio return can be a calculated return that is derived exclusively from a set if securities that are included in the set of securities covered by the analyst.

The return of the simulated portfolio can be calculated on all of the securities covered by the analyst. The weights represent a monetary value of shares assigned to each portfolio constituent when the portfolio is constructed or rebalanced. In one embodiment, securities rated a higher positive level recommendation are assigned a weight greater than or equal to a weight assigned to securities with a lower positive level recommendation. Securities rated with a positive recommendation are assigned a weight greater than or equal to that assigned to securities rated with a non-positive recommendation. Securities rated with a negative level recommendation are assigned a weight less than or equal to securities with a positive level recommendation. Securities rated as a negative level are assigned a weight that is proportional to their return multiplied by a number less than zero.

Simulated portfolio constituents are developed as a function of the analysts recommendations when the simulated portfolio is constructed or rebalanced. When the simulated portfolio is constructed or re-balanced, each security rated by the analyst or a proxy for the security can become a constituent based upon a set of portfolio inclusion rules, and each rule depends on the rating level assigned to the security. In one embodiment, a security with a neutral rating is represented in the portfolio by a proxy. In other embodiments securities with negative level ratings are represented in the portfolio by a proxy. In one embodiment, the proxy for securities rated at one or more of the rating levels is the benchmark portfolio. In one embodiment, the proxy for securities rated at one or more of the rating levels is a risk free security. Examples of suitable risk free securities include but are not limited to a, money market fund, U.S. treasury bill, short term international bond, zero-returning security, and the like.

The weight of each simulated portfolio constituent can be developed as a function of a size weighting and the weight derived from the recommendation level of each security being rated, when the simulated portfolio is constructed or re-balanced. The weight of each benchmark portfolio constituent can be developed as a function of a size weighting of each security in the benchmark portfolio when the benchmark portfolio is constructed or re-balanced.

All of the weights are normalized and when summed together have a value of 1. In one embodiment, the weights are all positive. Each weight has a weighting level. Between two adjacent weighting levels, the difference in the two weights can be a constant multiple. In one instance, a higher recommendation level is assigned to a weight that is a constant multiple, and the constant multiple is greater than a weight assigned to its adjacent recommendation level that has a lower recommendation level.

The size weighting can be a function of market capitalization or of float. The function can include proportional scaling, logarithmic scaling, and the like. Market capitalization is a monetary value of outstanding shares of each security in the portfolio. Float is a monetary value of available shares of each security in the portfolio. Additionally, the available shares is the number of security shares outstanding minus the number of shares unavailable for investing. In one embodiment, at least a portion of the shares unavailable for investing are selected from large private holdings, employee stock ownership plans, corporate cross-owned shares, government holdings, legally restricted shares, and the like.

In another embodiment of the present invention, a method of measuring performance of a security analyst includes selecting an analyst that covers a set of securities as well as a performance measurement time period. A return of a benchmark portfolio is then subtracted from a return of a simulated portfolio and multiplied by an adjustment factor. The return of the benchmark portfolio is derived exclusively from a selected set of securities that are included in the set of securities covered by the analyst. The simulated portfolio has constituents and weights that are a function of the analyst's recommendations on the securities in the selected set. For the simulated return, each security that is rated a negative level relative to a security with a non-negative rating is counted or credited in an amount that is proportional to a security return multiplied by a number less than zero.

The simulated portfolio constituents can be developed as a function of the analysts recommendations when the simulated portfolio is constructed or re-balanced.

In a portfolio calculation, a portfolio return is calculated for each interval between portfolio construction, rebalancing, or termination of the calculation period. During each interval, portfolio constituents and relative weights must be determined. The time period over which a portfolio return is calculated may consist of multiple intervals between construction, rebalancing, or termination of the period.

For a security during a time interval between portfolio construction, rebalancing, or termination of the calculation period, $$Rrawsyin=(pfsyin/pisyin-1)$$

where Rrawsyin is the raw security return for security y over the interval n, pfsyin is the price of the security on the last day of the interval, and pisyin is the price of the security on the last day of the previous interval.

Thereafter, a weighted return can be generated by multiplying, for each security and interval combination in the portfolio constituents and weights, the raw security return by its weighting value. By way of illustration, and without limitation, if a security's weighting value were 1, the security price on the last day of the previous interval were $100, the price on the last day of the interval were $101, the raw return would be $(101/100-1)=0.01$ and the weighted return would be 0.01.

Weighted returns can be calculated by multiplying, for each security and interval combination, the raw security return by the weighting value. A weighted portfolio return is produced for each interval by combining all of the weighted security returns for each interval.

A portfolio return can be generated for each interval between portfolio construction, rebalancing, or termination of the calculation period, by dividing the sum of the weighted returns of each security during the interval by the sum of the absolute value of the weighting factors of each security during the interval.

$$Rpi1=(WRs1i1+WRs2i1+\ldots WRsyi1)/(\text{absolute value}(ws1i1)+\text{absolute value}(ws2i1)+\ldots \text{absolute value}(wsyi1))$$

50 Where Rpi1 is the portfolio return for interval 1, WRsni1 is the Weighted return for security n during interval 1, and wsni1 is the weighting factor for security n during interval 1. Interval 1 represents any time interval between the time of construction or rebalancing and the time of the subsequent rebalancing or termination of the calculation period.

WRs1i1=Rraws1i1*ws1i1, where WRs1i1 is the weighted return of security 1 during interval 1, Rraws1i1 is the raw return of security 1 during interval 1, and ws1i1 is the weighting factor for security 1 during interval 1. The weighting factor for security 1 represents the weight of that constituent.

A portfolio return is generated for the period by combining all portfolio interval returns. This creates a portfolio return for the entire time period that is a benchmark portfolio return.

$$RT=((1+Rp1)*(1+Rpi2)..*(1+Rpin))-1$$

51 Where RT is the portfolio return for the entire evaluation time period and Rpin is the interval portfolio return for the n'th interval.

The weight of each simulated portfolio constituent can be developed as a function of a size weighting, The weight of each benchmark portfolio constituent is developed as a function of a size weighting of each security in the benchmark portfolio when the benchmark portfolio is constructed or re-balanced. Size weighting can be a function of market capitalization or float. The function can include proportional scaling, logarithmic scaling, scaling proportional to a power function, and the like.

Another embodiment of the present invention measures performance of a security analyst's recommendations creates the value add. The value add is determined by subtracting a return of a benchmark portfolio from a return of a simulated portfolio return and multiply by an adjustment factor. The return of the benchmark portfolio is derived exclusively from a selected set of securities that are included in the set of securities covered by the analyst. The simulated portfolio includes constituents and weights that are a function of the analyst's recommendations on the securities in the selected set. A performance rating of the analyst is provided and displayed.

Value add can then be utilized to create, an individual scorecard for an analyst, a rank order of analysts, an average value add for a group of analysts and the like. The group can be defined from a geographic location, a firm, an industry, a client and the like.

In another embodiment of the present invention, a performance measurement time period is selected that is divided into intervals. A value add is created for each interval. A portfolio statistic is created for each interval. In one instance, an average value add over all of the intervals is created. An average portfolio statistic is then created by averaging portfolio statistics of all of the intervals. The average value add is divided by the average portfolio statistic to create a risk adjusted value add. In another instance, a ratio is created of value add divided by portfolio statistic for at least one interval. The intervals can be any time period including but not limited to monthly.

The portfolio statistic can be a value that is representative of a variation during an interval of returns for all securities covered by the analyst. This value that is representative of the variation can be equal to a standard deviation of the interval returns of all securities covered by the analyst.

Referring now to FIG. 4, a screenshot illustrates the listing and displaying of individual analysts, and their individual value adds. FIG. 4 illustrates the further usage of the value add and includes, listing and displaying individual analysts and their individual value adds, calculating a median value add of a group of analysts, determining a percent of analysts within a group that have a value add above a selected level, comparing a value add of one analyst to value adds of a group of analysts, comparing a value add of an analyst to a value add average of analysts in a group, and the like.

Figure 5:
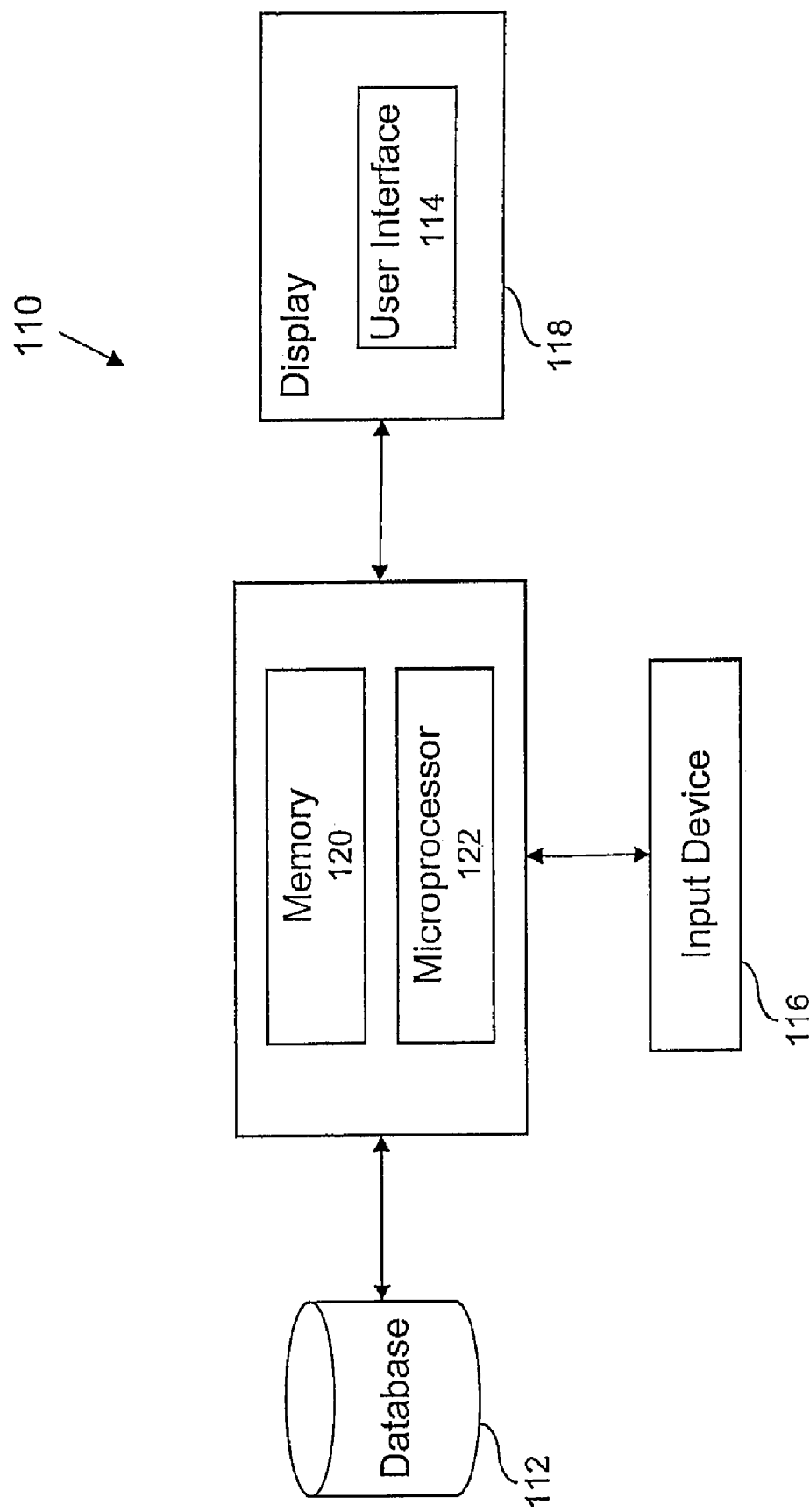
FIG. 5 is a block diagram illustrating one embodiment of a computer implemented system of the present invention for displaying security analyst recommendation information.

The present invention also provides a computer implemented system 110 for displaying security analyst recommendation information as illustrated in FIG. 5. System 110 includes a database 112. In one embodiment, database 112 has information on an overall analyst score and includes the value add, a user interface 114 including a plurality of selectable user inputs to enable a user to display analyst security recommendation information, an input device 116 that is operable by a user, and a display 118 for displaying at least one output of security analyst information according to the selected user inputs, a memory 120 for storing a variety of different information including but not limited to one or more of an analyst's benchmark portfolio return, simulated portfolio return, value add, returns of securities during time periods over which the analyst had specific rating levels on them within an overall performance measurement time period, and the like, and a microprocessor 122. In one embodiment, display 118 simultaneously displays at least one output of the analyst's securities recommendation performance and an estimates performance for a plurality of securities listed on a securities estimates list of the analyst.

At least one output can include a performance rating of the analyst relative to the analyst's securities recommendation performance. A variety of different user inputs can be provided including but not limited to inputs that enable a user to, select whether the portfolio calculations are sized weighted or non-size-weighted, select securities for inclusion in the performance calculation, selection of the recommendation performance measurement time period, selection of estimate performance time period, and the like.

Figure 6:
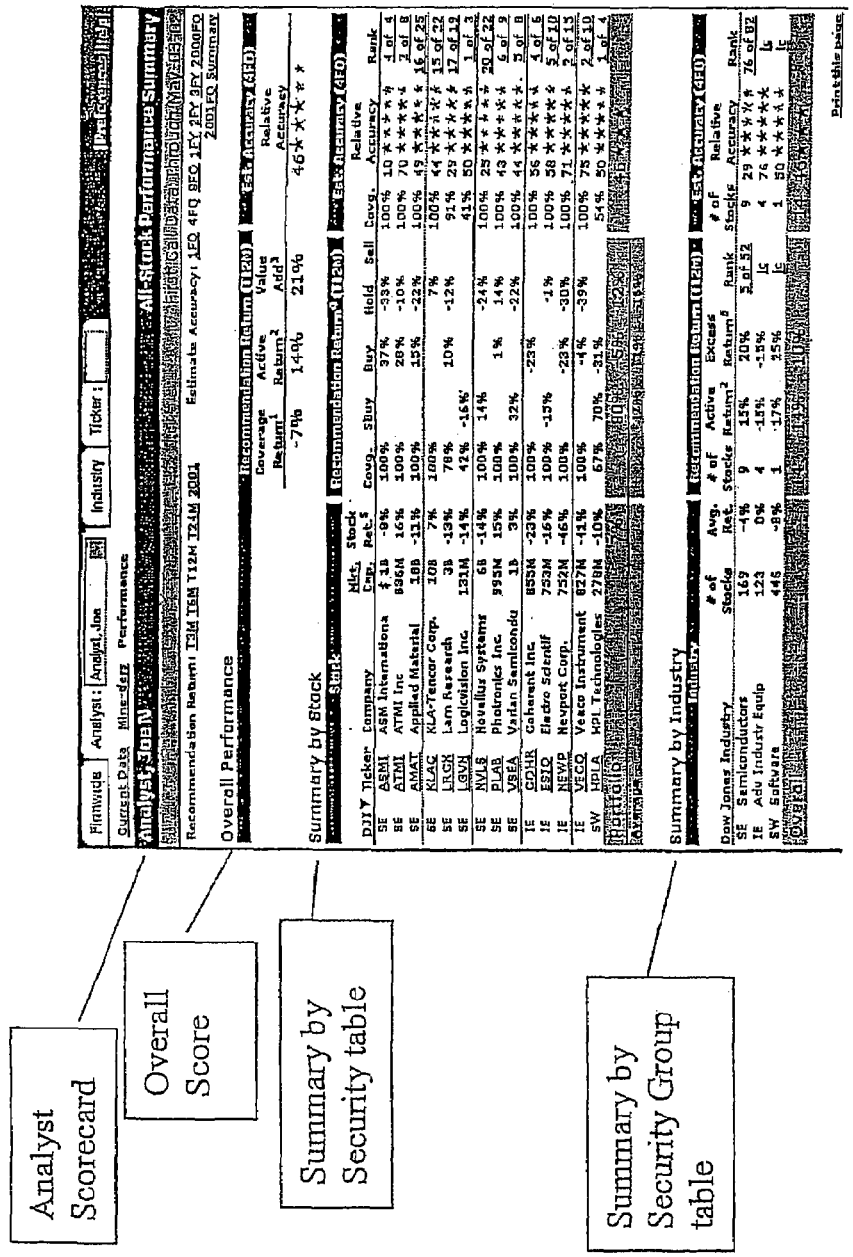
FIG. 6 is a screenshot illustrating one embodiment of an analyst scorecard of the present invention.

As shown in FIG. 6, a sample of an analyst scorecard with performance ratings, tables and the like are displayed. In various embodiments, the scorecard can include, a summary of one or more user outputs, the value add and an overall relative estimating accuracy score for the analyst, analyst benchmark portfolio return, simulated portfolio return, analyst securities recommendation. performance based on the analyst's security ratings, a summary of the user outputs from system 110, and the like.

System 110 can provide a variety of different user outputs including but not limited to, a calculated return for selected securities, a calculated return for selected securities while under each rating level, a performance rating of the analyst relative to the analyst's securities recommendation performance, and the like. All or a portion of the user outputs can include a summary row that provides cumulative information from individual rows in the table. All or a portion of the summary row can include a portfolio return, an average return and overall relative estimating accuracy score for the securities displayed in the table.

It will be appreciated that the scorecard can include a variety of information and displayed in different formats including but not limited to an overall analyst performance score, a summary by a security table, a summary by a security group table, and the like.

In another embodiment of the present invention, display 110 can provide a summary of an individual analyst's securities recommendation performance that is displayable as an output in a variety of different forms including but not limited to a, summary by security table, summary by security group table, an analyst overall score and the like.

As illustrated in FIG. 6, the summary by security table can include rows and columns that are interchangeable. Each security rated by the analyst during the selected time period can be listed in the summary by security table. User outputs can be provided in the summary by security table. In one embodiment, the user outputs can be performance results of each security of the analyst's securities ratings that are then summarized and displayed as an output as a single row and a plurality of columns with information.

By way of illustration, and without limitation, examples of information in the columns can include but is not limited to, security group classification, ticker symbol, company name, security size, security return, securities recommendation coverage, return under each rating level, coverage percent for earnings estimating, relative estimating accuracy score for estimates, relative estimating accuracy star rating or rank for estimates, FIG. 6 also illustrates a summary by security group table with rows and columns that are interchangeable. Each group of securities rated by the analyst during the selected time period can be listed in the summary by security group table. User outputs can be provided in the summary by security group table. In one embodiment, the user outputs can be performance results of each security group of the analyst's securities ratings that are then summarized and displayed as an output as a single row and a plurality of columns with information, and the like.

By way of illustration, and without limitation, examples of information in the columns can include but is not limited to, security group name abbreviation, security group name, number of stocks in a security group, an average return of securities in a security group, number of securities in a security group covered by the analyst's recommendations, the analyst's simulated return within a security group, the analyst's excess return for the security group, the analyst's recommendation performance rank relative to other analysts that cover a security group, number of securities in a security group covered by the analyst's estimates, accuracy score of the analyst for a security group, the analyst's estimate performance rank relative to other analysts that cover a security group, and the like.

Each row of the summary by security table can include an analyst performance for an individual security. A variety of different columns can be provided including but not limited to columns that, enables a user to select securities for aggregation, an indication of continued coverage of a selected security by the analyst, an indication of a security group classification, an indication of a security ticker symbol, names of securities, country code or name for the exchange on which each security is traded, country code or name representing the country in which the company which the security represents is located, a security size where size is a function of market capitalization or float, a return of a security over a selected performance measurement time period, information relative to a percent of a selected performance measurement time period that an analyst had a recommendation for a security, analyst rating, return of a security under each type of analyst rating, relative estimating accuracy performance score for a security, table with a summary of individual analyst's security recommendation performance for a plurality of analyst, and the like.

System 110 can provide a variety of user inputs, including but not limited to selection of, analyst name, performance measurement time period, whether the portfolio calculations are sized weighted or non-weighted, securities for inclusion in the performance calculation.

In one embodiment of the present invention, a summary by security group table is provided that can displayed as rows and columns of desired information. The group can be, securities in the same industry, securities in the same geographic region, or a user-defined group of securities. Performance results of the analyst's securities ratings of securities in a same security group can then be summarized and displayed as an output in a single row.

Figure 7:
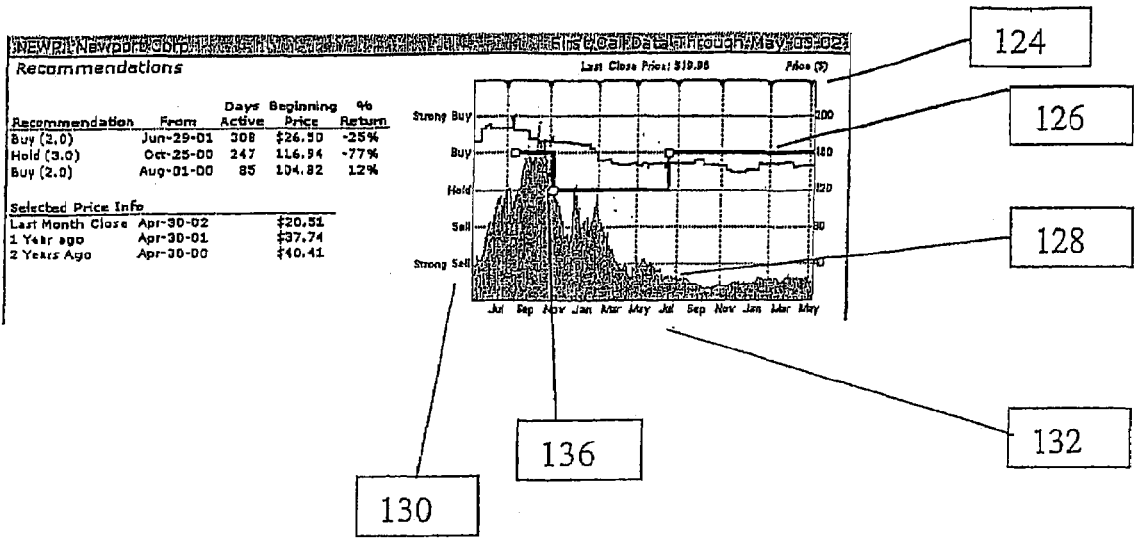
FIG. 7 is a screenshot illustrating one embodiment of a summary of an individual analyst's ratings for a security that is displayed as a graph or chart.

In another embodiment of the present invention, illustrated, in FIG. 7, system 110 can provide a summary of an individual analyst's ratings for a security that can be displayable as a graph or chart 124 with at least two time series plots 126 and 128 respectively. One of the time series plots 126 or 128 is representative of the analyst's recommendations over time. Analyst recommendations are plotted against a vertical axis 130 which is representative of recommendation levels, and a horizontal axis 132 that is representative of time. The other time series plot 126 or 128 is representative of a price for the security over time; where the price for the security is plotted against another vertical axis 134 that is representative of security price and horizontal axis 132. It will be appreciated that vertical and horizontal axes 130 and 132 are interchangeable.

In one embodiment of system 110, the analyst's rating level for a security is represented as a series of points or a horizontal line (collectively a plotted line 136) at a level that is representative of the analyst's rating level. Plotted line 136 continues until a point in time 136 where a change occurs. Suitable changes include but are not limited to an increase in a recommendation, a decrease in a recommendation level, a discontinuation of recommendation level, and the like. When the change is, (i) a discontinuation of the recommendation on the stock, and plotted line 136 terminates at a point on graph 124 that is representative of the time that the recommendation is discontinued, or (ii) is represented during the period without recommendation, then plotted line 136 can be a line of a different color, a line type, or any other representative that makes it distinguished, over subsequent time intervals Plotted line 136 during the period without recommendation continues until the analyst reinstates coverage for the security. A new issued recommendation is represented by a line color or type that is the same as the line color or type that represented the recommendation level for the period prior to the time without recommendation. The level of the plot corresponds to the recommendation level of the newly issued recommendation.

The change can be from one recommendation level to a different recommendation level. The plotted recommendation level can be plotted as a stairstep to represent a change in recommendation level as illustrated in FIG. 7.

In one embodiment, a reiteration of the recommendation level for the security at the same recommendation level is shown as a data marker on the plot at the time of a reiteration.

Chart 124 can be configurable to provide an overlay or underlay of one or more of the following, (i) a highest recommendation level of a plurality of analysts, (ii) a lowest recommendation level of the plurality of analysts or (iii) an average recommendation level of the plurality of analysts.

In various embodiments, system 110 can provide that a change in the highest or lowest recommendation level of the analysts that can be plotted as a stairstep to represent the change in recommendation level.

The time period for the chart display can be selectable by the user. One or more tables can be provided that summarize data contained in chart 124. Such tables can be displayed in conjunction with chart 124 and include information or each recommendation level selected from one or more of, (i) recommendation level, (ii) initiation date, (iii) termination date, (iv) amount of time active, (v) price at the time of initiation, (vi) price at time of termination or (vii)percent return over the duration of the recommendation. Further, such tables can provide summarizing data contained chart 124 that are displayed in conjunction with chart 124 and can include information selected from one or more of the following, (i) date of interest, which can include the beginning of the chart period, (ii) the end of the chart period, (iii) the beginning of any month or year or (iv) the date and the price level of the security.

The present invention also is a computer-readable medium imprinted with a computer program that contains instruction steps. Upon installation of computer program in a general purpose computer, any of the methods of the present invention are performed.

The methods and systems of the present invention can be utilized for a variety of different uses and applications such as (i) to monitor security analysts, (ii) monitor performance of security analysts, (iii) tie compensation of security analysts to performance, (iii) to provide quality control of security analysts, (iv) for compliance purposes with government and/or regulatory agencies rules and regulations, (v) compliance with employer standards, rules and conditions, (vi) marketing purposes, and the like.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A computer-implemented method of measuring performance of a security analyst, comprising:
    identifying a set of securities covered by the security analyst during a time period, wherein information relating to the set of securities covered by the security analyst is stored in a database coupled to a microprocessor;
    calculating, on the microprocessor, a benchmark return for a benchmark portfolio during the time period, the benchmark portfolio derived exclusively from the set of securities covered by the security analyst during the time period, wherein the benchmark portfolio includes one unit of each security in the set of securities for which the security analyst had a rating during the time period;

calculating, on the microprocessor, a simulated return for a simulated portfolio during the time period, the simulated portfolio derived exclusively from the set of securities covered by the security analyst during the time period, wherein the simulated portfolio includes a weighted number of units of each security in the set of securities for which the security analyst had the rating during the time period; and measuring, on the microprocessor, performance of the security analyst during the time period based on a difference between the benchmark return and the simulated return.

2. The method of claim 1, wherein each security in the benchmark portfolio is included in the benchmark portfolio for a subset of the time period, wherein the subset of the time period includes a portion of the time period during which the analyst had the rating for the respective security.

3. The method of claim 1, wherein the number of units of each security in the simulated portfolio is weighted based on analyst's rating for the respective security during the time period.

4. The method of claim 3, wherein the simulated portfolio includes two units of each security in the set of securities for which the analyst had a strong buy rating during the time period, one unit of each security in the set of securities for which the analyst had a buy rating during the time period, one unit of cash for each security in the set of securities for which the analyst had a hold rating during the time period, and one negative unit of each security in the set of securities for which the analyst had a sell or a strong sell rating during the time period.

5. A computer-implemented method of measuring performance of a security analyst, comprising:

identifying a set of securities covered by the security analyst during a time period, wherein information related to the set of securities covered by the security analyst is stored in a database coupled to a microprocessor;

calculating, on the microprocessor, a benchmark return for a benchmark portfolio during the time period, the benchmark portfolio derived exclusively from a subset of the set of securities covered by the security analyst during the time period, wherein the subset of securities in the benchmark portfolio includes securities for which the security analyst had a rating during the time period, and wherein the benchmark return is calculated for the subset of securities during the time period;

calculating, on the microprocessor, a simulated return for a simulated portfolio during the time period, the simulated portfolio derived exclusively from the subset of securities in the benchmark portfolio, wherein the simulated portfolio includes constituents and weights for each of the securities in the subset of securities that are a function of a recommendation level associated with the security analyst's rating for the respective security during the time period, and wherein the simulated return is calculated for the subset of securities during the time period; and subtracting, on the microprocessor, the benchmark return from the simulated return, wherein a result of subtracting the benchmark return from the simulated return provides a measure of performance for the security analyst during the time period.

6. The method of claim 5, wherein each security in the benchmark portfolio is included in the benchmark portfolio for a subset of the time period, wherein the subset of the time period includes a portion of the time period during which the analyst had the rating for the respective security.

7. The method of claim 5, wherein the weights include a number of units for each security in the simulated portfolio based on the analyst's rating for the respective security during the time period.

8. The method of claim 7, wherein the constituents and weights cause the simulated portfolio to include multiple units of each security rated at a strong buy recommendation level, one unit of each security rated at a buy recommendation level, one unit of cash for each security rated at a hold recommendation level, and one negative unit of each security rated at a sell or a strong sell recommendation level.

9. The method of claim 5, wherein the subset of securities includes all of the securities covered by the analyst during the time period.

10. The method of claim 5, wherein each of the weights represent a monetary value of shares assigned to one of the constituents when the simulated portfolio is constructed or rebalanced.

11. The method of claim 10, wherein each of the constituents represent the function of the recommendation level associated with the analyst's rating for the securities in the subset securities when the simulated portfolio is constructed or rebalanced.

12. The method of claim 10, wherein all of the weights are normalized and sum to a value of 1.

13. The method of claim 10, wherein each of the weights has a positive value.

14. The method of claim 10, wherein each of the weights has a weighting level.

15. The method of claim 14, wherein a difference in weights between two adjacent weighting levels is a constant multiple.

16. The method of claim 15, wherein for adjacent recommendation levels, a security rated at a higher recommendation level is assigned a weight that is greater than a weight assigned to a security rated at an adjacent lower recommendation level by the constant multiple.

17. The method of claim 5, wherein securities rated at a higher positive recommendation level are assigned a weight that is greater than or equal to a weight assigned to securities rated at a lower positive recommendation level.

18. The method of claim 5, wherein securities rated at a negative recommendation level are assigned a weight that is less than or equal to a weight assigned to securities rated at a non-negative recommendation level.

19. The method of claim 5, wherein securities rated at a positive recommendation level are assigned a weight that is greater than or equal to a weight assigned to securities rated at a non-positive recommendation level.

20. The method of claim 5, wherein securities rated at a negative recommendation level are assigned a weight that is proportional to a return of the securities multiplied by a number that is less than zero.

21. The method of claim 6, wherein the simulated portfolio constituents are developed as a function of the recommendation level associated with the analyst's rating when the simulated portfolio is constructed or rebalanced.

22. The method of claim 21, wherein when the simulated portfolio is constructed or rebalanced, each security for which the analyst has a rating or a proxy becomes one of the constituents based upon one or more portfolio inclusion rules, each of the rules depending on the recommendation level associated with the ahalyst's rating for the security.

23. The method of claim 22, wherein a security rated at a neutral or a negative recommendation level is represented in the portfolio by a proxy.

24. The method of claim 22, wherein the proxy for securities rated at one or more of the recommendation levels is a risk free security.

25. The method of claim 24, wherein the risk free security includes at least one of a money market fund, a U.S. treasury bill, a short term international bond, or a zero-returning security.

26. The method of claim 21, wherein each of the weights include a size weighting derived from the recommendation level associated with the analyst's rating for each of the securities in the subset of securities when the portfolio is constructed or rebalanced.

27. The method of claim 26, wherein the size weighting for each of the securities in the subset of securities is a function of market capitalization or float.

28. The method of claim 27, wherein the size weighting function includes proportional scaling.

29. The method of claim 27, wherein the size weighting function includes logarithmic scaling.

30. The method of claim 26, wherein the size weighting for each of the securities in the subset of securities includes an equal weight assigned to each of the securities when the portfolio is constructed or rebalanced.

31. The method of claim 27, wherein market capitalization is a monetary value of outstanding shares of the security.

32. The method of claim 27, wherein float is a monetary value of available shares of the security.

33. The method of claim 32, wherein the available shares are a number of outstanding shares of the security minus a number of shares of the security unavailable for investing.

34. The method of claim 33, wherein the shares unavailable for investing include one or more of large private holdings, employee stock ownership plans, corporate cross-owned shares, government holdings, or legally restricted shares.

35. The method of claim 5, wherein the result of subtracting the benchmark portfolio return from the simulated portfolio return represents a value add for the analyst.

36. The method of claim 35, further comprising:
multiplying the value add by an adjustment factor to create a risk adjusted value add for the analyst; and
storing the risk adjusted value add in a memory coupled to the microprocessor.

37. The method of claim 36, wherein the adjustment factor is a function of a weighted average of values representing a time series variation of a price for each of the securities covered by the analyst.

38. The method of claim 36, wherein the adjustment factor is a function of a value representing a variance among returns for each of the securities covered by the analyst.

39. The method of claim 36, further comprising:
using one or more of the value add or the risk adjusted value add to rank the analyst among a plurality of analysts.

40. The method of claim 35, further comprising:
calculating an aggregated value add for a plurality of analysts.

41. The method of claim 36, further comprising,
displaying a list that includes a plurality of analysts and their individual value adds or risk adjusted value adds.

42. The method of claim 40, wherein the plurality of analysts are defined according to one or more of a geographic location, a firm, a user specified group, or an industry.

43. The method of claim 36, further comprising:
determining a percent of analysts among a plurality of analysts that have a value add or a risk adjusted value add above a selected level.

44. The method of claim 36, further comprising:
comparing one or more of the value add or the risk adjusted value add for the analyst to value adds or risk adjusted value adds for plurality of analysts.

45. The method of claim 35, wherein the time period is divided into a plurality of intervals, the method further comprising:
creating a value add for each of the intervals by subtracting the benchmark return from the simulated return for each of the intervals;
creating a portfolio statistic for each of the intervals;
creating an average value add over all of the intervals;
creating an average portfolio statistic over all of the intervals by averaging the portfolio statistics for all the intervals;
dividing the average value add by the average portfolio statistic to create a risk adjusted value add; and
storing the risk adjusted value add in a memory coupled to the microprocessor.

46. The method of claim 45, wherein each of the intervals is a monthly time period.

47. The method of claim 45, wherein the portfolio statistic is a value representing a variance among returns for each of the securities covered by the analyst during one of the intervals.

48. The method of claim 47, wherein the value representing the variance equals a standard deviation of the returns for each of the securities covered by the analyst during the interval.

49. The method of claim 35, wherein the time period is divided into a plurality of intervals, the method further comprising:
creating a value add for each of the intervals by subtracting the benchmark return from the simulated return for each of the intervals;
creating a portfolio statistic for each of the intervals;
dividing the value add by the portfolio statistic to create a risk adjusted value add for at least one of the intervals; and
storing the risk adjusted value add in a memory coupled to the microprocessor.

50. A computer-implemented method of measuring performance of a security analyst, comprising:
identifying a set of securities covered by the security analyst during a time period, wherein information relating to the set of securities covered by the security analyst is stored in a database coupled to a microprocessor;
calculating, on the microprocessor, a benchmark return for a benchmark portfolio during the time period, the benchmark portfolio derived exclusively from the set of securities covered by the security analyst during the time period, wherein the benchmark portfolio includes one unit of each security in the set of securities for which the security analyst had a rating during the time period;
generating, on the microprocessor, a simulated return for a simulated portfolio during the time period, the simulated portfolio derived exclusively from the set of securities covered by the security analyst during the time period, wherein the portfolio includes a weighted number of units of each security in the set of securities that is based on the security analyst's rating for the respective security during the time period; and
storing a performance metric for the security analyst during the time period in a memory coupled to the microprocessor wherein the performance metric is based on a comparison between the benchmark return calculated for the benchmark portfolio and the simulated return generated for the simulated portfolio.

51. A computer-implemented method of measuring performance of a security analyst, comprising:
- identifying a set of securities covered by the security analyst during a time periods, wherein information relating to the set of securities covered by the security analyst is stored in a database coupled to a microprocessor;
- generating, on the microprocessor, a first benchmark return for a first portfolio during the time period, the first portfolio derived exclusively from the set of securities covered by the security analyst during the time period, wherein the first portfolio includes a first number of units of each security in the set of securities for which the security analyst had a rating during the time period;
- generating, on the microprocessor, a second benchmark return for a second portfolio during the time period, the second portfolio derived exclusively from the set of securities covered by the security analyst during the time period, wherein the second portfolio includes a second number of units of each security in the set of securities for which the security analyst had the rating during the time period;
- calculating, on the microprocessor, a performance metric for the security analyst during the time period based on a comparison between the first benchmark return generated for the first portfolio and the second benchmark return generated for the second portfolio; and
- storing the performance metric in a memory coupled to the microprocessor.

52. A system for measuring performance of a security analyst, comprising:
- a database configured to store information relating to a set of securities covered by the security analyst during a time period; and
- a microprocessor coupled to the database and configured to:
  - identify the set of securities covered by the security analyst during the time period from the information stored in the database;
  - calculate a benchmark return for a benchmark portfolio during the time period, the benchmark portfolio derived exclusively from the set of securities covered by the security analyst during the time period, wherein the benchmark portfolio includes one unit of each security in the set of securities for which the security analyst had a rating during the time period;
  - calculate a simulated return for a simulated portfolio during the time period, the simulated portfolio derived exclusively from the set of securities covered by the security analyst during the time period, wherein the simulated portfolio includes a weighted number of units of each security in the set of securities for which the security analyst had the rating during the time period; and
  - measure performance of the security analyst during the time period based on'a difference between the benchmark return and the simulated return.

53. A system for measuring performance of a security analyst, comprising:
- a database configured to store information relating to a set of securities covered by the security analyst during a time period; and
- a microprocessor coupled to the database and configured to:
  - identify the set of securities covered by the security analyst during the time period from the information stored in the database;
  - calculate a benchmark return for a benchmark portfolio during the time period, the benchmark portfolio derived exclusively from a subset of the set of securities covered by the security analyst during the time period, wherein the subset of securities in the benchmark portfolio includes securities for which the security analyst had a rating during the time period, and wherein the benchmark return is calculated for the subset of securities during the time period;
  - calculate a simulated return for a simulated portfolio during the time period, the simulated portfolio derived exclusively from the subset of securities in the benchmark portfolio, wherein the simulated portfolio includes constituents and weights for each of the securities in the subset of securities that are a function of a recommendation level associated with the security analyst's rating for the respective security during the time period, and wherein the simulated return is calculated for the subset of securities during the time period; and
  - subtract the benchmark return from the simulated return, wherein a result of subtracting the benchmark return from the simulated return provides a measure of performance for the security analyst during the time period.

* * * * *